(12) United States Patent
Gholmieh et al.

(10) Patent No.: US 10,194,446 B2
(45) Date of Patent: Jan. 29, 2019

(54) TECHNIQUES AND APPARATUSES FOR CONCURRENT RESOURCE USAGE FOR WWAN AND WLAN

(71) Applicant: QUALCOMM Incorporated, San Diego, CA (US)

(72) Inventors: Aziz Gholmieh, Del Mar, CA (US); Leena Zacharias, San Jose, CA (US); Srinivasan Balasubramanian, San Diego, CA (US); Francis Ngai, Louisville, CO (US)

(73) Assignee: Qualcomm Incorporated, San Diego, CA (US)

( * ) Notice: Subject to any disclaimer, the term of this patent is extended or adjusted under 35 U.S.C. 154(b) by 101 days.

(21) Appl. No.: 15/426,591

(22) Filed: Feb. 7, 2017

(65) Prior Publication Data
US 2018/0227902 A1    Aug. 9, 2018

(51) Int. Cl.
*H04W 72/04* (2009.01)
*H04W 72/08* (2009.01)
*H04B 7/0413* (2017.01)
*H04W 72/12* (2009.01)
*H04W 88/06* (2009.01)

(52) U.S. Cl.
CPC ........ *H04W 72/048* (2013.01); *H04B 7/0413* (2013.01); *H04W 72/08* (2013.01); *H04W 72/1215* (2013.01); *H04W 88/06* (2013.01)

(58) Field of Classification Search
CPC ... H04W 72/048; H04W 72/08; H04B 7/0413
See application file for complete search history.

(56) References Cited

U.S. PATENT DOCUMENTS

| | | |
|---|---|---|
| 9,258,734 B2 | 2/2016 | Zhu |
| 2013/0303168 A1* | 11/2013 | Aminzadeh Gohari ..................... H04W 36/0083 455/436 |
| 2013/0322267 A1 | 12/2013 | Edara et al. |
| 2015/0155891 A1 | 6/2015 | Soliman |
| 2016/0066364 A1 | 3/2016 | Marinier et al. |
| 2016/0127993 A1 | 5/2016 | Wang |
| 2016/0165576 A1 | 6/2016 | Awoniyi-Oteri et al. |
| 2016/0337515 A1 | 11/2016 | Shi et al. |

OTHER PUBLICATIONS

International Search Report and Written Opinion—PCT/US2017/065416—ISA/EPO—dated Mar. 6, 2018.

* cited by examiner

*Primary Examiner* — Afshawn M Towfighi
(74) *Attorney, Agent, or Firm* — Harrity & Harrity, LLP

(57) ABSTRACT

Aspects of the present disclosure generally relate to wireless communications. In some aspects, a user equipment (UE) may determine whether to configure the UE for a first type of resource sharing or a second type of resource sharing between a first radio access technology (RAT) and a second RAT, wherein one or more UE resources are configured for use with the first RAT. The UE may reconfigure the one or more UE resources for use with the second RAT based at least in part on determining whether to configure the UE for the first type of resource sharing or the second type of resource sharing.

30 Claims, 18 Drawing Sheets

TECHNIQUES AND APPARATUSES FOR
CONCURRENT RESOURCE USAGE FOR
WWAN AND WLAN

FIELD OF THE DISCLOSURE

Aspects of the present disclosure generally relate to wireless communications, and more particularly to techniques and apparatuses for concurrent resource usage for wireless wide area network (WWAN) and wireless local area network (WLAN).

BACKGROUND

Wireless communication systems are widely deployed to provide various telecommunication services, such as telephony, video, data, messaging, and broadcasts. Typical wireless communication systems may employ multiple-access technologies capable of supporting communication with multiple users by sharing available system resources (e.g., bandwidth, transmit power, etc.). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of a telecommunication standard is Long Term Evolution (LTE). LTE is a set of enhancements to the Universal Mobile Telecommunications System (UMTS) mobile standard promulgated by Third Generation Partnership Project (3GPP). LTE is designed to better support mobile broadband Internet access by improving spectral efficiency, lowering costs, improving services, using new spectrum, and integrating with other open standards using OFDMA on the downlink (DL), SC-FDMA on the uplink (UL), and multiple-input multiple-output (MIMO) antenna technology.

SUMMARY

In some aspects, a method for wireless communication may include determining, by a user equipment (UE), whether to configure the UE for a first type of resource sharing or a second type of resource sharing between a first radio access technology (RAT) and a second RAT, wherein one or more UE resources are configured for use with the first RAT. The method may include reconfiguring, by the UE, the one or more UE resources for use with the second RAT based at least in part on determining whether to configure the UE for the first type of resource sharing or the second type of resource sharing.

In some aspects, a UE for wireless communication may include a memory and one or more processors operatively coupled to the memory. The one or more processors may determine whether to configure the UE for a first type of resource sharing or a second type of resource sharing between a first radio access technology (RAT) and a second RAT, wherein one or more UE resources are configured for use with the first RAT. The one or more processors may reconfigure the one or more UE resources for use with the second RAT based at least in part on determining whether to configure the UE for the first type of resource sharing or the second type of resource sharing.

In some aspects, a non-transitory computer-readable medium for wireless communication may store one or more instructions for wireless communication. The one or more instructions, when executed by one or more processors, may cause the one or more processors to determine whether to configure a UE for a first type of resource sharing or a second type of resource sharing between a first radio access technology (RAT) and a second RAT, wherein one or more UE resources are configured for use with the first RAT. The one or more instructions, when executed by the one or more processors, may cause the one or more processors to reconfigure the one or more UE resources for use with the second RAT based at least in part on determining whether to configure the UE for the first type of resource sharing or the second type of resource sharing.

In some aspects, an apparatus for wireless communication may include means for determining whether to configure the apparatus for a first type of resource sharing or a second type of resource sharing between a first radio access technology (RAT) and a second RAT, wherein one or more resources are configured for use with the first RAT. The apparatus may include means for reconfiguring the one or more resources for use with the second RAT based at least in part on determining whether to configure the apparatus for the first type of resource sharing or the second type of resource sharing.

Aspects generally include a method, apparatus, system, computer program product, non-transitory computer-readable medium, and user equipment as substantially described herein with reference to and as illustrated by the accompanying drawings.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
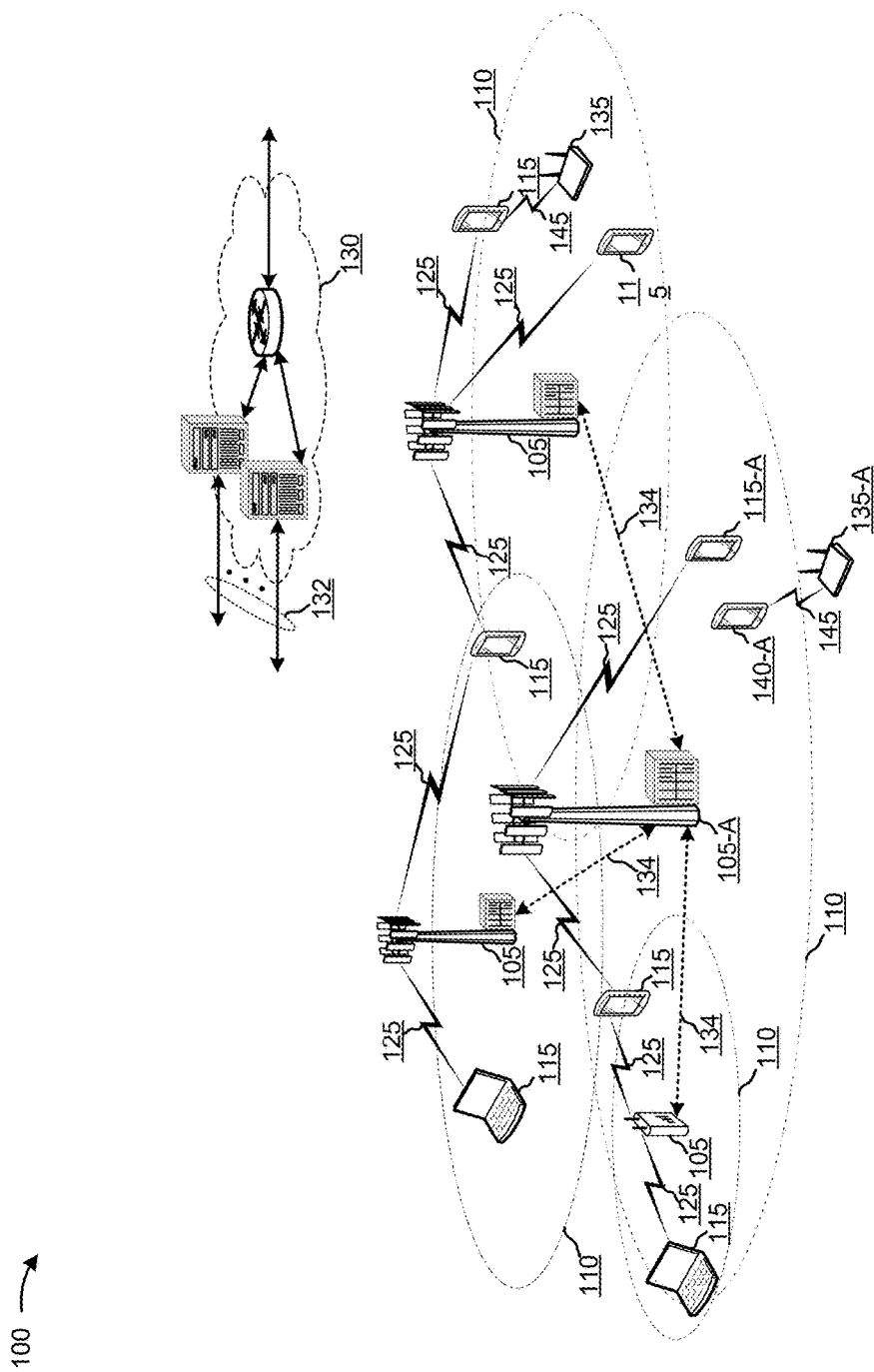
FIG. 1 is an illustration of an example wireless communication system, in accordance with various aspects of the present disclosure.

The detailed description set forth below, in connection with the appended drawings, is intended as a description of various configurations and is not intended to represent the only configurations in which the concepts described herein may be practiced. The detailed description includes specific details for providing a thorough understanding of the various concepts. However, it will be apparent to those skilled in the art that these concepts may be practiced without these specific details.

The techniques described herein may be used for one or more of various wireless communication networks, such as code division multiple access (CDMA) networks, time division multiple access (TDMA) networks, frequency division multiple access (FDMA) networks, orthogonal FDMA (OFDMA) networks, single carrier FDMA (SC-FDMA) networks, or other types of networks. A CDMA network may implement a radio access technology (RAT), such as universal terrestrial radio access (UTRA), CDMA2000, or the like. UTRA may include wideband CDMA (WCDMA) and/or other variants of CDMA. CDMA2000 may include Interim Standard (IS)-2000, IS-95 and IS-856 standards. IS-2000 may also be referred to as 1× radio transmission technology (1×RTT), CDMA2000 1×, or the like. A TDMA network may implement a RAT such as global system for mobile communications (GSM), enhanced data rates for GSM evolution (EDGE), or GSM/EDGE radio access network (GERAN). An OFDMA network may implement a RAT such as evolved UTRA (E-UTRA), ultra mobile broadband (UMB), Institute of Electrical and Electronics Engineers (IEEE) 802.11 (Wi-Fi), IEEE 802.16 (WiMAX), IEEE 802.20, Flash-OFDM, or the like. UTRA and E-UTRA may be part of the universal mobile telecommunication system (UMTS). 3GPP long-term evolution (LTE) and LTE-Advanced (LTE-A) are example releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the wireless networks and RATs mentioned above as well as other wireless networks and RATs.

Additionally, or alternatively, the techniques described herein may be used in connection with New Radio (NR), which may also be referred to as 5G. New Radio is a set of enhancements to the LTE mobile standard promulgated by the 3GPP. NR is designed to better support mobile broadband Internet access by improving spectral efficiency, lowering costs, improving services, making use of new spectrum, and better integrating with other open standards using OFDM with a cyclic prefix (CP) (CP-OFDM) on the downlink (DL), using CP-OFDM and/or SC-FDM (e.g., also known as discrete Fourier transform spread ODFM (DFT-s-OFDM)) on the uplink (UL), as well as supporting beamforming, multiple-input multiple-output (MIMO) antenna technology, and carrier aggregation.

FIG. 1 is an illustration of an example wireless communication system 100, in accordance with various aspects of the disclosure. The wireless communication system 100 may include a WWAN network, such as a cellular network, and a WLAN network, such as a Wi-Fi network. The cellular network may include one or more base stations 105, 105-A, one or more UEs 115, 115-A, and a core network 130. The Wi-Fi network may include one or more WLAN access points 135, 135-A (e.g., Wi-Fi access points) and one or more WLAN stations 140, 140-A (e.g., Wi-Fi stations).

With reference to the cellular network of the wireless communication system 100, the core network 130 may provide user authentication, access authorization, tracking, Internet Protocol (IP) connectivity, and other access, routing, or mobility functions. The base stations 105, 105-A may interface with the core network 130 through backhaul links 132 (e.g., S1, etc.) and may perform radio configuration and scheduling for communication with the UEs 115, 115-A, or may operate under the control of a base station controller (not shown). In various examples, the base stations 105, 105-A may communicate, either directly or indirectly (e.g., through core network 130), with each other over backhaul links 134 (e.g., X2, etc.), which may be wired or wireless communication links.

The base stations 105, 105-A may wirelessly communicate with the UEs 115, 115-A via one or more base station antennas. Each of the base station 105, 105-A sites may provide communication coverage for a respective geographic coverage area 110. In some examples, a base station 105, 105-A may be referred to as a base transceiver station, a radio base station, an access point, a radio transceiver, a NodeB, an eNodeB (eNB), a Home NodeB, a Home eNodeB, or some other suitable terminology. The geographic coverage area 110 for a base station 105, 105-A may be divided into sectors making up a portion of the coverage area (not shown). The cellular network may include base stations 105, 105-A of different types (e.g., macro and/or small cell base stations). There may be overlapping geographic coverage areas 110 for different technologies.

In some examples, the cellular network may include an LTE/LTE-A network. In LTE/LTE-A networks, the term evolved Node B (eNB) may be used to describe the base stations 105, 105-A, while the term UE may be used to describe the UEs 115, 115-A. The cellular network may be a Heterogeneous LTE/LTE-A network in which different types of eNBs provide coverage for various geographical regions. For example, each eNB or base station 105, 105-A may provide communication coverage for a macro cell, a small cell, and/or another type of cell. The term "cell" is a 3GPP term that can be used to describe a base station, a carrier or component carrier associated with a base station, or a coverage area (e.g., sector, etc.) of a carrier or base station, depending on context.

A macro cell may cover a relatively large geographic area (e.g., several kilometers in radius) and may allow unrestricted access by UEs with service subscriptions with the network provider. A small cell may be a lower-powered base station, as compared with a macro cell that may operate in the same or different (e.g., licensed, unlicensed, etc.) radio frequency spectrum bands as macro cells. Small cells may include pico cells, femto cells, and micro cells according to various examples. A pico cell may cover a relatively smaller geographic area and may allow unrestricted access by UEs with service subscriptions with the network provider. A femto cell also may cover a relatively small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, or the like) cells (e.g., component carriers).

The cellular network may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The cellular network may in some examples include a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A MAC layer may perform priority handling and multiplexing of logical channels into transport channels. The MAC layer may also use Hybrid ARQ (HARQ) to provide retransmission at the MAC layer to improve link efficiency. In the control plane, the Radio Resource Control (RRC) protocol layer may provide establishment, configuration, and maintenance of an RRC connection between a UE 115, 115-A and the base stations 105, 105-A or core network 130 supporting radio bearers for the user plane data. At the Physical (PHY) layer, the transport channels may be mapped to Physical channels.

The UEs 115, 115-A may be dispersed throughout the wireless communication system 100, and each UE 115, 115-A may be stationary or mobile. A UE 115, 115-A may also include or be referred to by those skilled in the art as a mobile station, a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or some other suitable terminology. A UE 115, 115-A may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with various types of base stations 105, 105-A and network equipment, including macro eNBs, small cell eNBs, relay base stations, or the like.

The communication links 125 shown in wireless communication system 100 may carry downlink (DL) transmissions from a base station 105, 105-A to a UE 115, 115-A, and/or uplink (UL) transmissions from a UE 115, 115-A to a base station 105, 105-A. The downlink transmissions may also be called forward link transmissions, while the uplink transmissions may also be called reverse link transmissions.

In some examples, each communication link 125 may include one or more carriers, where each carrier may be a signal made up of multiple sub-carriers (e.g., waveform signals of different frequencies) modulated according to the various radio technologies described above. Each modulated signal may be sent on a different subcarrier and may carry control information (e.g., reference signals, control channels, etc.), overhead information, user data, etc. The communication links 125 may transmit bidirectional communications using a frequency division duplexing (FDD) operation (e.g., using paired spectrum resources) or a time division duplexing (TDD) operation (e.g., using unpaired spectrum resources). Frame structures for FDD operation (e.g., frame structure type 1) and TDD operation (e.g., frame structure type 2) may be defined.

In some aspects of the wireless communication system 100, base stations 105, 105-A and/or UEs 115, 115-A may include multiple antennas for employing antenna diversity schemes to improve communication quality and reliability between base stations 105, 105-A and UEs 115, 115-A. Additionally or alternatively, base stations 105, 105-A and/or UEs 115, 115-A may employ multiple-input, multiple-output (MIMO) techniques that may take advantage of multi-path environments to transmit multiple spatial layers carrying the same or different coded data.

The wireless communication system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115, 115-A may be configured with multiple downlink CCs and one or more uplink CCs for carrier aggregation. Carrier aggregation may be used with both FDD and TDD component carriers.

With reference to the Wi-Fi network of the wireless communication system 100, the WLAN access points 135, 135-A may wirelessly communicate with the WLAN stations 140, 140-A via one or more WLAN access point antennas, over one or more communication links 145. In some examples, the WLAN access points (AP) 135, 135-A may communicate with the WLAN stations 140, 140-A using one or more Wi-Fi communication standards, such as an Institute of Electrical and Electronics (IEEE) Standard 802.11 (e.g., IEEE Standard 802.11a, IEEE Standard 802.11n, or IEEE Standard 802.11ac).

In some examples, a WLAN station 140, 140-A may be a cellular phone, a personal digital assistant (PDA), a wireless communication device, a handheld device, a tablet computer, a laptop computer, or the like. In some examples, an apparatus may include aspects of both a UE 115, 115-A and a WLAN station 140, 140-A, and such an apparatus may communicate with one or more base stations 105, 105-A using a first radio access technology (RAT) (e.g., a cellular RAT or multiple cellular RATs), and communicate with one or more WLAN access points 135, 135-A using a second RAT (e.g., a Wi-Fi RAT or multiple Wi-Fi RATs).

In some examples, the base stations 105, 105-A and UEs 115, 115-A may communicate over a licensed radio frequency spectrum band and/or an unlicensed radio frequency spectrum band, whereas the WLAN access points 135, 135-A and WLAN stations 140, 140-A may communicate over the unlicensed radio frequency spectrum band. The unlicensed radio frequency spectrum band may therefore be shared by the base stations 105, 105-A, the UEs 115, 115-A, the WLAN access points 135, 135-A, and/or the WLAN stations 140, 140-A.

The number and arrangement of components shown in FIG. 1 are provided as an example. In practice, wireless communication system 100 may include additional devices, fewer devices, different devices, or differently arranged devices than those shown in FIG. 1. Additionally, or alternatively, a set of devices (e.g., one or more devices) of wireless communication system 100 may perform one or more functions described as being performed by another set of devices of wireless communication system 100.

Figure 2:
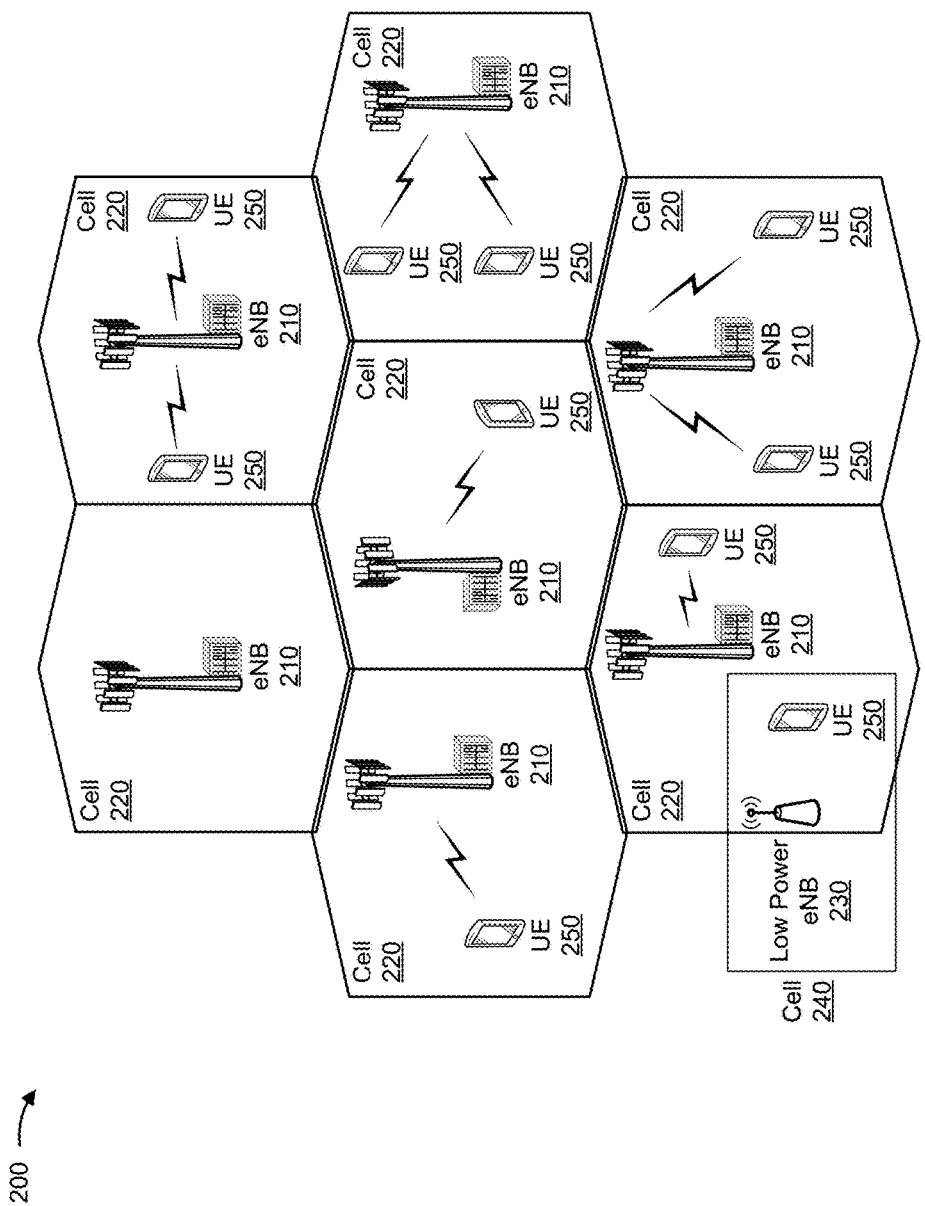
FIG. 2 is a diagram illustrating an example access network in an LTE network architecture, in accordance with various aspects of the present disclosure.

FIG. 2 is a diagram illustrating an example access network 200 in an LTE network architecture, in accordance with various aspects of the present disclosure. As shown, access network 200 may include a set of eNBs 210 that serve a corresponding set of cellular regions (cells) 220, a set of low power eNBs 230 that serve a corresponding set of cells 240, and a set of UEs 250.

Each eNB 210 may be assigned to a respective cell 220 and may be configured to provide an access point to a RAN. For example, eNB 210 may provide an access point for UE 250 to a RAN (e.g., eNB 210 may correspond to base station 105, shown in FIG. 1). UE 250 may correspond to UE 115, shown in FIG. 1. FIG. 2 does not illustrate a centralized controller for example access network 200, but access network 200 may use a centralized controller in some aspects. The eNBs 210 may perform radio related functions including radio bearer control, admission control, mobility control, scheduling, security, and network connectivity.

As shown in FIG. 2, one or more low power eNBs 230 may serve respective cells 240, which may overlap with one or more cells 220 served by eNBs 210. The low power eNBs 230 may correspond to base station 105, shown in FIG. 1. A low power eNB 230 may be referred to as a remote radio head (RRH). The low power eNB 230 may include a femto cell eNB (e.g., home eNB (HeNB)), a pico cell eNB, a micro cell eNB, or the like.

A modulation and multiple access scheme employed by access network 200 may vary depending on the particular telecommunications standard being deployed. In LTE applications, OFDM is used on the downlink (DL) and SC-FDMA is used on the uplink (UL) to support both frequency division duplexing (FDD) and time division duplexing (TDD). The various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. As another example, these concepts may also be extended to UTRA employing WCDMA and other variants of CDMA (e.g., such as TD-SCDMA, GSM employing TDMA, E-UTRA, or the like), UMB, IEEE 802.11 (Wi-Fi), IEEE 802.16 (WiMAX), IEEE 802.20, Flash-OFDM employing OFDMA, or the like. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The number and arrangement of devices and cells shown in FIG. 2 are provided as an example. In practice, there may be additional devices and/or cells, fewer devices and/or cells, different devices and/or cells, or differently arranged devices and/or cells than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) shown in FIG. 2 may perform one or more functions described as being performed by another set of devices shown in FIG. 2.

Figure 3:
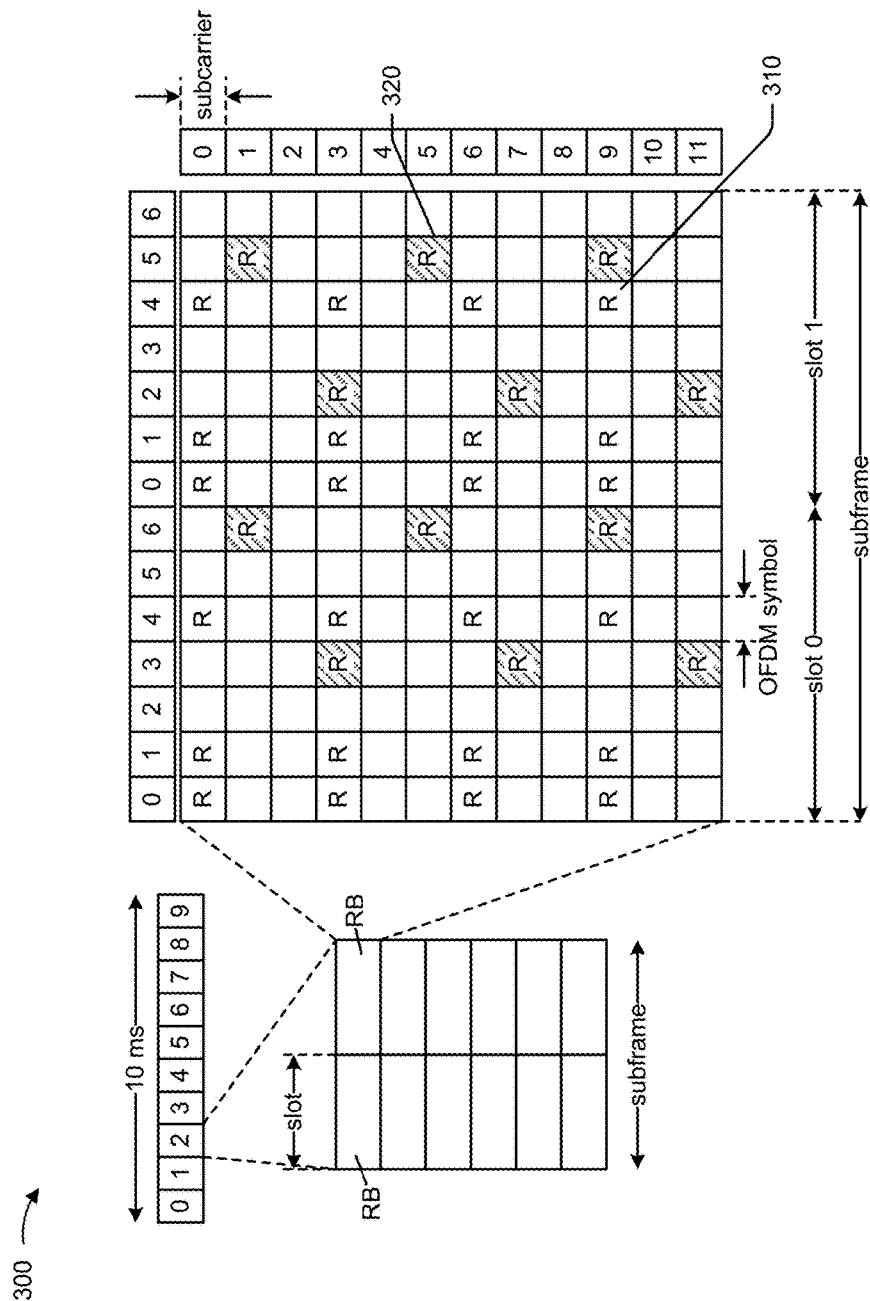
FIG. 3 is a diagram illustrating an example of a downlink (DL) frame structure in LTE, in accordance with various aspects of the present disclosure.

FIG. 3 is a diagram illustrating an example 300 of a downlink (DL) frame structure in LTE, in accordance with various aspects of the present disclosure. A frame (e.g., of 10 ms) may be divided into 10 equally sized sub-frames with indices of 0 through 9. Each sub-frame may include two consecutive time slots. A resource grid may be used to represent two time slots, each time slot including a resource block (RB). The resource grid is divided into multiple resource elements. In LTE, a resource block includes 12 consecutive subcarriers in the frequency domain and, for a normal cyclic prefix in each OFDM symbol, 7 consecutive OFDM symbols in the time domain, or 84 resource elements. For an extended cyclic prefix, a resource block includes 6 consecutive OFDM symbols in the time domain and has 72 resource elements. Some of the resource elements, as indicated as R 310 and R 320, include DL reference signals (DL-RS). The DL-RS include Cell-specific RS (CRS) (also sometimes called common RS) 310 and UE-specific RS (UE-RS) 320. UE-RS 320 are transmitted only on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

In LTE, an eNB may send a primary synchronization signal (PSS) and a secondary synchronization signal (SSS) for each cell in the eNB. The primary and secondary synchronization signals may be sent in symbol periods 6 and 5, respectively, in each of subframes 0 and 5 of each radio frame with the normal cyclic prefix (CP). The synchronization signals may be used by UEs for cell detection and acquisition. The eNB may send a Physical Broadcast Channel (PBCH) in symbol periods 0 to 3 in slot 1 of subframe 0. The PBCH may carry certain system information.

The eNB may send a Physical Control Format Indicator Channel (PCFICH) in the first symbol period of each subframe. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. The eNB may send a Physical HARQ Indicator Channel (PHICH) and a Physical Downlink Control Channel (PDCCH) in the first M symbol periods of each subframe. The PHICH may carry information to support hybrid automatic repeat request (HARQ). The PDCCH may carry information on resource allocation for UEs and control information for downlink channels. The eNB may send a Physical Downlink Shared Channel (PDSCH) in the remaining symbol periods of each subframe. The PDSCH may carry data for UEs scheduled for data transmission on the downlink.

The eNB may send the PSS, SSS, and PBCH in the center 1.08 MHz of the system bandwidth used by the eNB. The eNB may send the PCFICH and PHICH across the entire system bandwidth in each symbol period in which these channels are sent. The eNB may send the PDCCH to groups of UEs in certain portions of the system bandwidth. The eNB may send the PDSCH to specific UEs in specific portions of the system bandwidth. The eNB may send the PSS, SSS, PBCH, PCFICH, and PHICH in a broadcast manner to all UEs, may send the PDCCH in a unicast manner to specific UEs, and may also send the PDSCH in a unicast manner to specific UEs.

A number of resource elements may be available in each symbol period. Each resource element (RE) may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1, and 2. The PDCCH may occupy 9, 18, 36, or 72 REGs, which may be selected from the available REGs, in the first M symbol periods, for example. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. An eNB may send the PDCCH to the UE in any of the combinations that the UE will search.

As indicated above, FIG. 3 is provided as an example. Other examples are possible and may differ from what was described above in connection with FIG. 3.

Figure 4:
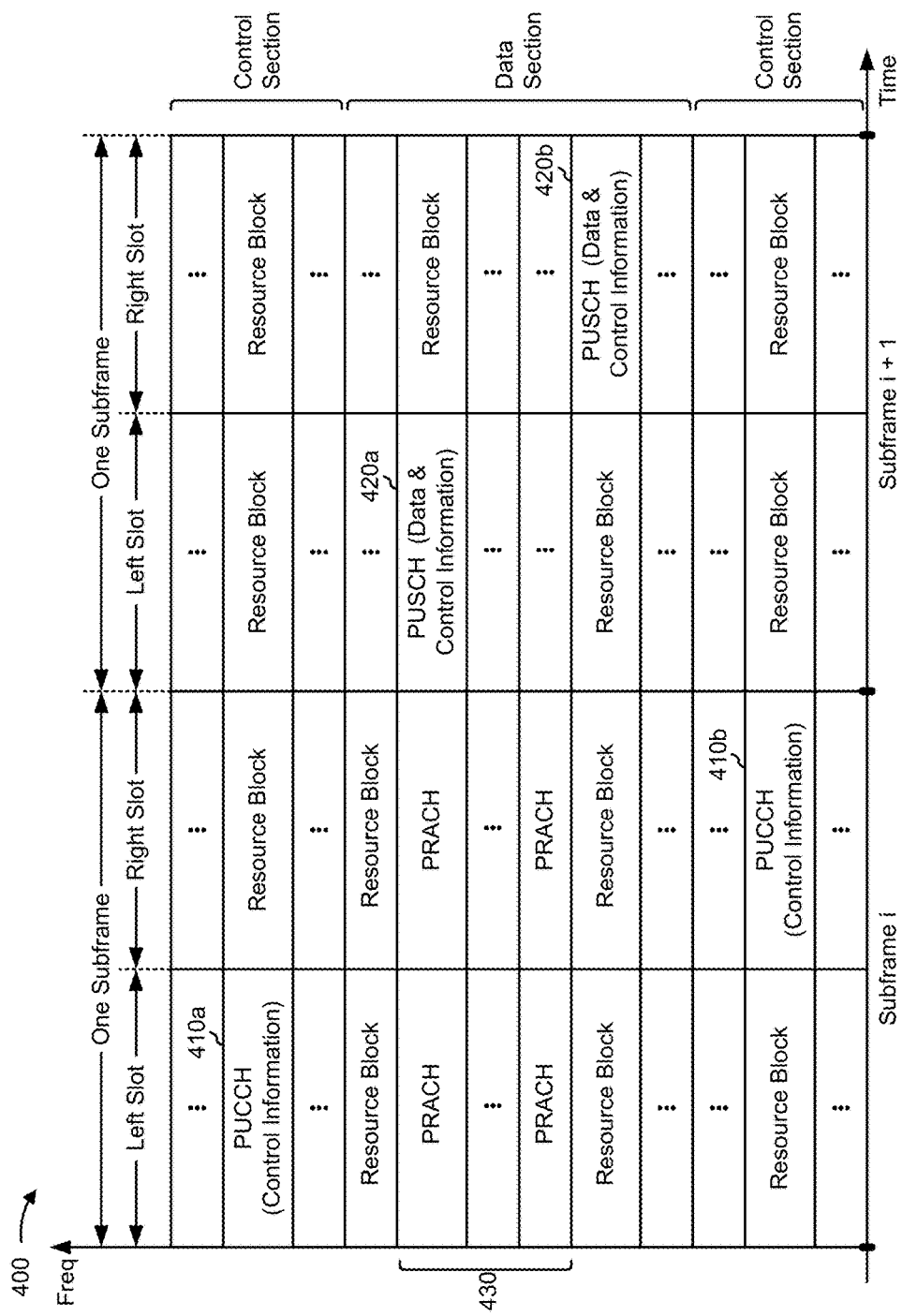
FIG. 4 is a diagram illustrating an example of an uplink (UL) frame structure in LTE, in accordance with various aspects of the present disclosure.

FIG. 4 is a diagram illustrating an example 400 of an uplink (UL) frame structure in LTE, in accordance with various aspects of the present disclosure. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB. The UE may also be assigned resource blocks 420a, 420b in the data section to transmit data to the eNB. The UE may transmit control information in a physical UL control channel (PUCCH) on the assigned resource blocks in the control section. In some aspects, the UE may transmit only data or both data and control information in a physical UL shared channel (PUSCH) on the assigned resource blocks in the data section. A UL transmission may span both slots of a subframe and may hop across frequencies.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (e.g., of 1 ms) or in a sequence of few contiguous subframes.

As indicated above, FIG. 4 is provided as an example. Other examples are possible and may differ from what was described above in connection with FIG. 4.

Figure 5:
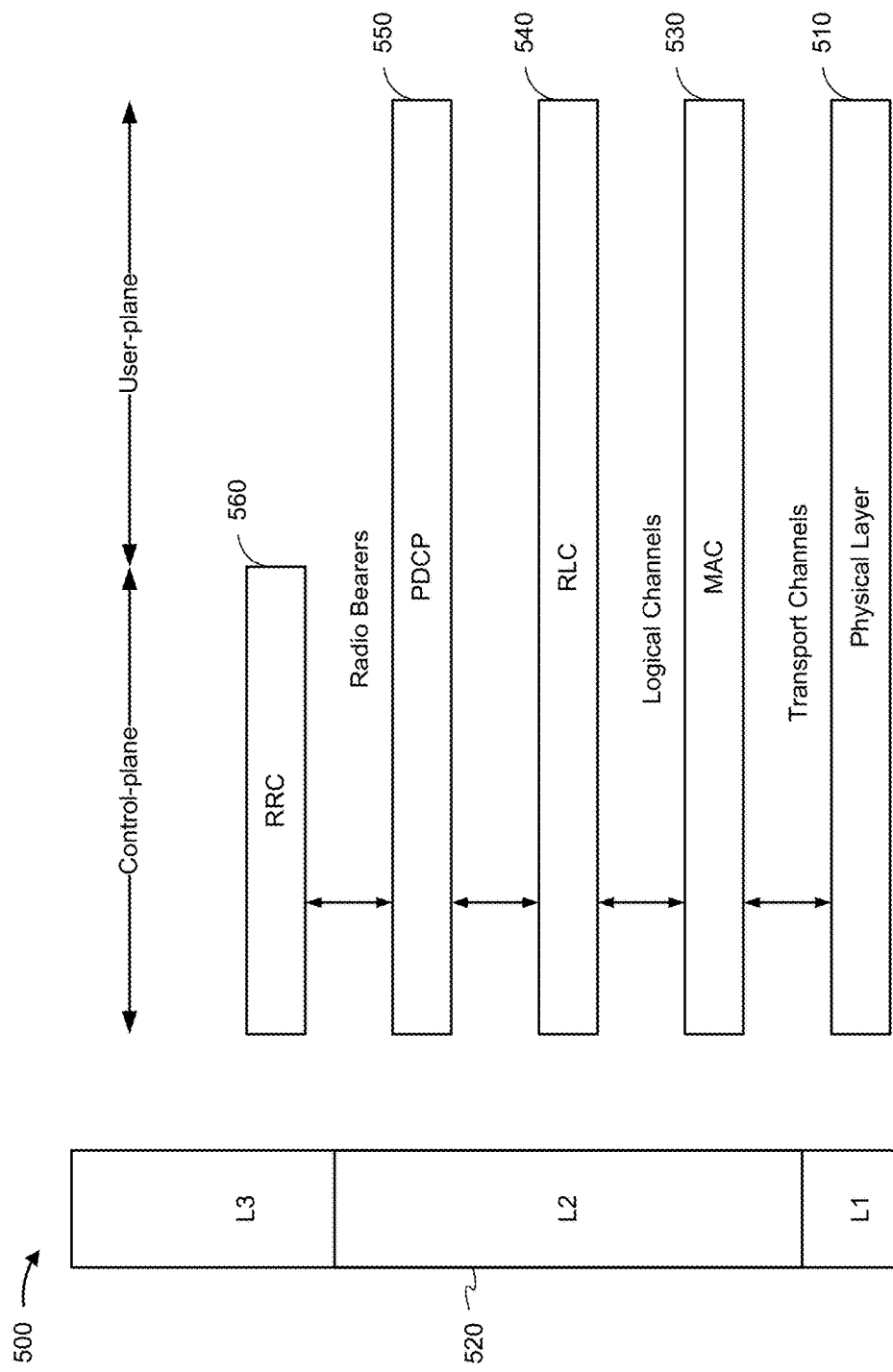
FIG. 5 is a diagram illustrating an example of a radio protocol architecture for a user plane and a control plane in LTE, in accordance with various aspects of the present disclosure.

FIG. 5 is a diagram illustrating an example 500 of a radio protocol architecture for a user plane and a control plane in LTE, in accordance with various aspects of the present disclosure. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 510. Layer 2 (L2 layer) 520 is above the physical layer 510 and is responsible for the link between the UE and eNB over the physical layer 510.

In the user plane, the L2 layer 520 includes a media access control (MAC) sublayer 530, a radio link control (RLC) sublayer 540, and a packet data convergence protocol (PDCP) sublayer 550, which are terminated at the eNB on the network side. Although not shown, the UE may have several upper layers above the L2 layer 520 including a network layer (e.g., IP layer) that is terminated at a packet data network (PDN) gateway on the network side, and an application layer that is terminated at the other end of the connection (e.g., far end UE, server, etc.).

The PDCP sublayer 550 provides multiplexing between different radio bearers and logical channels. The PDCP sublayer 550 also provides header compression for upper layer data packets to reduce radio transmission overhead, security by ciphering the data packets, and handover support for UEs between eNBs. The RLC sublayer 540 provides segmentation and reassembly of upper layer data packets, retransmission of lost data packets, and reordering of data packets to compensate for out-of-order reception due to hybrid automatic repeat request (HARQ). The MAC sublayer 530 provides multiplexing between logical and transport channels. The MAC sublayer 530 is also responsible for allocating the various radio resources (e.g., resource blocks) in one cell among the UEs. The MAC sublayer 530 is also responsible for HARQ operations.

In the control plane, the radio protocol architecture for the UE and eNB is substantially the same for the physical layer 510 and the L2 layer 520 with the exception that there is no header compression function for the control plane. In some aspects, integrity protection may be provided for the control plane data. The control plane also includes a radio resource control (RRC) sublayer 560 in Layer 3 (L3 layer). The RRC sublayer 560 is responsible for obtaining radio resources (i.e., radio bearers) and for configuring the lower layers using RRC signaling between the eNB and the UE.

As indicated above, FIG. 5 is provided as an example. Other examples are possible and may differ from what was described above in connection with FIG. 5.

Figure 6:
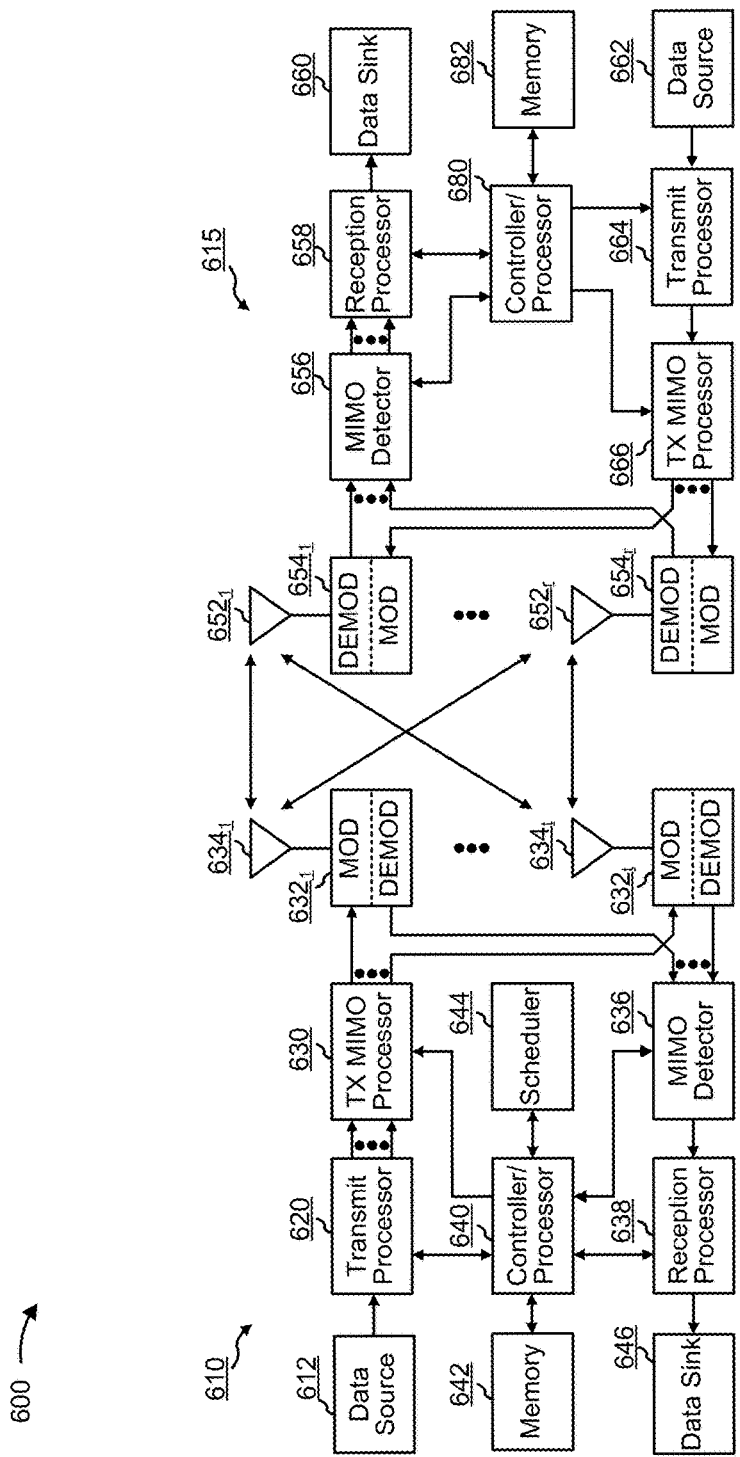
FIG. 6 is a diagram illustrating example components of a communication system including a base station and a UE, in accordance with various aspects of the present disclosure.

FIG. 6 is an illustration of example components of a communication system 600 including a base station 610 and a UE 615, in accordance with various aspects of the present disclosure. In some aspects, base station 610 may correspond to one or more of the base stations and/or eNBs 105, 105-A, 210, or 230 described with reference to FIG. 1 or 2. In some aspects, UE 615 may correspond to one or more of the UEs 115, 115-A, or 250 described above with reference to FIG. 1 or 2. Base station 610 may be equipped with antennas $634_{1-t}$, and UE 615 may be equipped with antennas $652_{1-r}$, wherein t and r are integers greater than or equal to one.

At base station 610, a base station transmit processor 620 may receive data from a base station data source 612 and control information from a base station controller/processor 640. The control information may be carried on the Physical Broadcast Channel (PBCH), the Physical Control Format Indicator Channel (PCFICH), the Physical Hybrid-ARQ Indicator Channel (PHICH), the Physical Downlink Control Channel (PDCCH), or the like. The data may be carried on the Physical Downlink Shared Channel (PDSCH), for example. Base station transmit processor 620 may process (e.g., encode and symbol map) the data and control information to obtain data symbols and control symbols, respectively. Base station transmit processor 620 may also generate reference symbols, e.g., for the PSS, SSS, and cell-specific reference signal (RS). A base station transmit (TX) multiple-input multiple-output (MIMO) processor 630 may perform spatial processing (e.g., precoding) on the data symbols, the control symbols, and/or the reference symbols, if applicable, and may provide output symbol streams to base station modulators/demodulators (MODs/DEMODs) $632_{1-t}$. Each base station modulator/demodulator 632 may process a respective output symbol stream (e.g., for orthogonal frequency-division multiplexing (OFDM), or the like) to obtain an output sample stream. Each base station modulator/demodulator 632 may further process (e.g., convert to analog, amplify, filter, and upconvert) the output sample stream to obtain a downlink signal. Downlink signals from modulators/demodulators $632_{1-t}$ may be transmitted via antennas $634_{1-t}$, respectively.

At UE 615, UE antennas $652_{1-r}$ may receive the downlink signals from base station 610 and may provide received signals to UE modulators/demodulators (MODs/DEMODs) $654_{1-r}$, respectively. Each UE modulator/demodulator 654 may condition (e.g., filter, amplify, downconvert, and digitize) a respective received signal to obtain input samples. Each UE modulator/demodulator 654 may further process the input samples (e.g., for OFDM, etc.) to obtain received symbols. A UE MIMO detector 656 may obtain received symbols from all UE modulators/demodulators $654_{1-r}$, and perform MIMO detection on the received symbols, if applicable, and provide detected symbols. A UE reception processor 658 may process (e.g., demodulate, deinterleave, and decode) the detected symbols, provide decoded data for UE 615 to a UE data sink 660, and provide decoded control information to a UE controller/processor 680.

On the uplink, at UE 615, a UE transmit processor 664 may receive and process data (e.g., for the Physical Uplink Shared Channel (PUSCH)) from a UE data source 662 and control information (e.g., for the Physical Uplink Control Channel (PUCCH)) from UE controller/processor 680. UE transmit processor 664 may also generate reference symbols for a reference signal. The symbols from UE transmit processor 664 may be precoded by a UE TX MIMO processor 666, if applicable, may be further processed by UE modulator/demodulators $654_{1-r}$ (e.g., for SC-FDM, etc.), and may be transmitted to base station 610. At base station 610, the uplink signals from UE 615 may be received by base station antennas 634, processed by base station modulators/demodulators 632, detected by a base station MIMO detector 636, if applicable, and further processed by a base station reception processor 638 to obtain decoded data and control information sent by UE 615. Base station reception processor 638 may provide the decoded data to a base station data sink 646 and the decoded control information to base station controller/processor 640.

Base station controller/processor 640 and UE controller/processor 680 may direct operation of base station 610 and UE 615, respectively. Base station controller/processor 640 and/or other processors and modules at base station 610 may perform or direct, for example, execution of various processes for the techniques described herein. UE controller/processor 680 and/or other processors and modules at UE 615 may also perform or direct, for example, execution of one or more blocks illustrated in FIG. 13, FIG. 14, FIG. 15, and/or other processes for the techniques described herein. A base station memory 642 and a UE memory 682 may store data and program code for base station 610 and UE 615, respectively. A scheduler 644 may schedule UEs 615 for data transmission on the downlink and/or uplink.

In one configuration, UE 615 may include means for concurrent resource usage for WWAN and WLAN, as described herein. In one aspect, the aforementioned means may be UE controller/processor 680, UE memory 682, UE reception processor 658, UE MIMO detector 656, UE modulators/demodulators 654, and/or UE antennas 652 configured to perform the functions recited by the aforementioned means. In another aspect, the aforementioned means may be a module, at least partially implemented in hardware, or any apparatus configured to perform the functions recited by the aforementioned means.

The number and arrangement of components shown in FIG. 6 are provided as an example. In practice, there may be additional components, fewer components, different components, or differently arranged components than those shown in FIG. 6. Furthermore, two or more components shown in FIG. 6 may be implemented within a single component, or a single components shown in FIG. 6 may be implemented as multiple, distributed components. Additionally, or alternatively, a set of components (e.g., one or more components) shown in FIG. 6 may perform one or more functions described as being performed by another set of components shown in FIG. 6.

Figure 7:
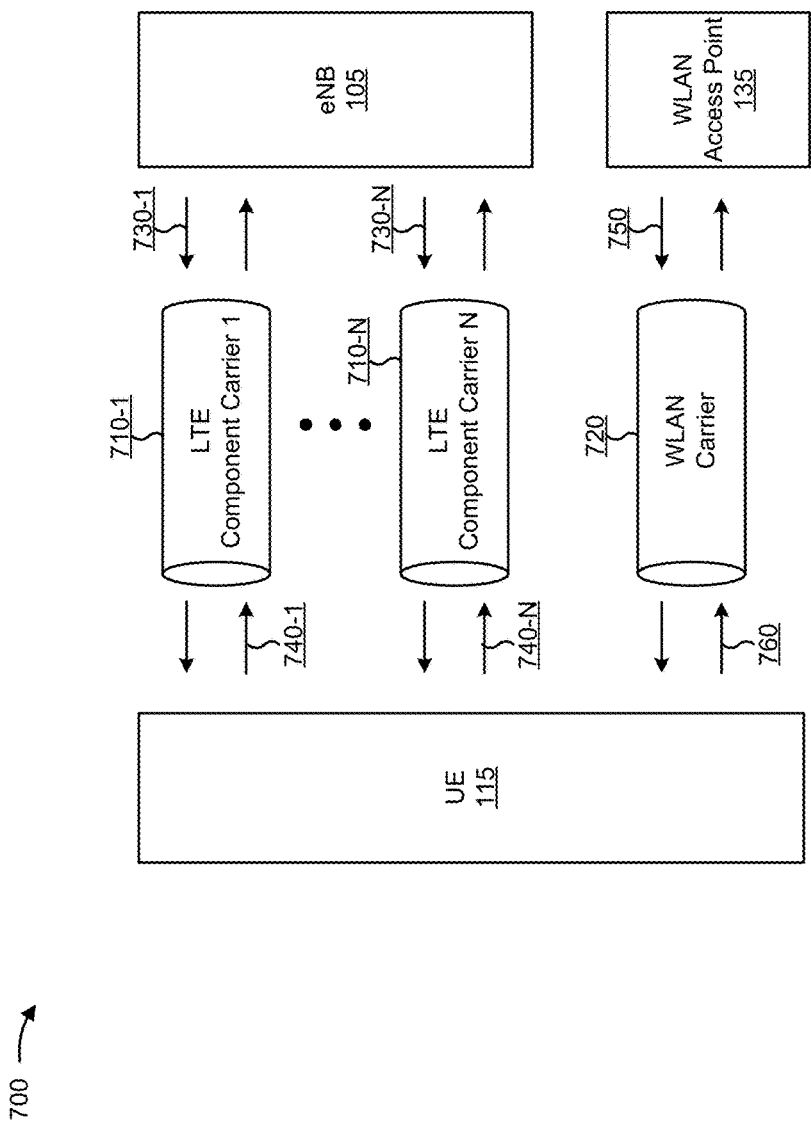
FIG. 7 is a diagram illustrating an example of carrier aggregation, in accordance with various aspects of the present disclosure.

FIG. 7 is a diagram illustrating an example 700 of carrier aggregation, in accordance with various aspects of the present disclosure.

Carrier aggregation may occur in a system including a multi-mode UE 115, which can communicate with eNB 105 using one or more component carriers 710-1 through 710-N (N≥1) (sometimes referred to herein as $CC_1$ through $CC_N$), and with a WLAN access point 135 using WLAN carrier 720. In some aspects, eNB 105 may transmit information to UE 115 via forward (downlink) channels 730-1 through 730-N on LTE component carriers $CC_1$ through $CC_N$. Additionally, or alternatively, UE 115 may transmit information to eNB 105 via reverse (uplink) channels 740-1 through 740-N on LTE component carriers $CC_1$ through $CC_N$. In some aspects, WLAN access point 135 may transmit information to UE 115 via forward (downlink) channel 750 on WLAN carrier 720. Additionally, or alternatively, UE 115 may transmit information to WLAN access point 135 via reverse (uplink) channel 760 of WLAN carrier 720.

In multi-carrier operations, downlink control information (DCI) messages associated with different UEs 115 may be carried on multiple component carriers. For example, the DCI on a PDCCH may be included on the same component carrier that is configured to be used by UE 115 for PDSCH transmissions (e.g., same-carrier signaling). Additionally, or alternatively, the DCI may be carried on a component carrier different from the target component carrier used for PDSCH transmissions (e.g., cross-carrier signaling). In some aspects, a carrier indicator field (CIF), which may be semi-statically enabled, may be included in some or all DCI formats to facilitate the transmission of PDCCH control signaling from a carrier other than the target carrier for PDSCH transmissions (e.g., cross-carrier signaling), and/or the like.

As indicated above, FIG. 7 is provided as an example. Other examples are possible and may differ from what is described in connection with FIG. 7.

Figure 8A:
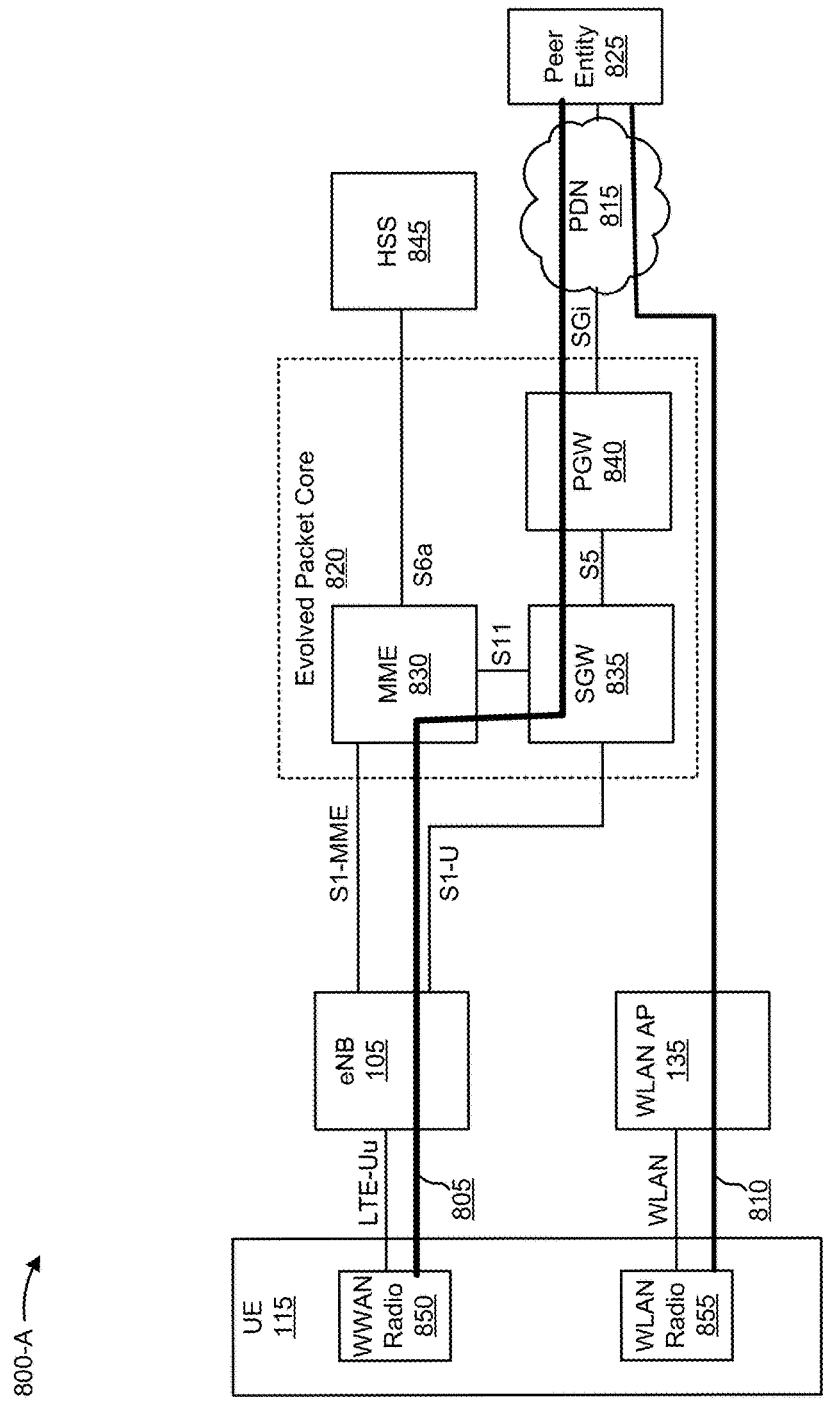
FIGS. 8A and 8B are diagrams illustrating examples of data paths between a UE and a packet data network (PDN), in accordance with various aspects of the present disclosure.
Figure 8B:
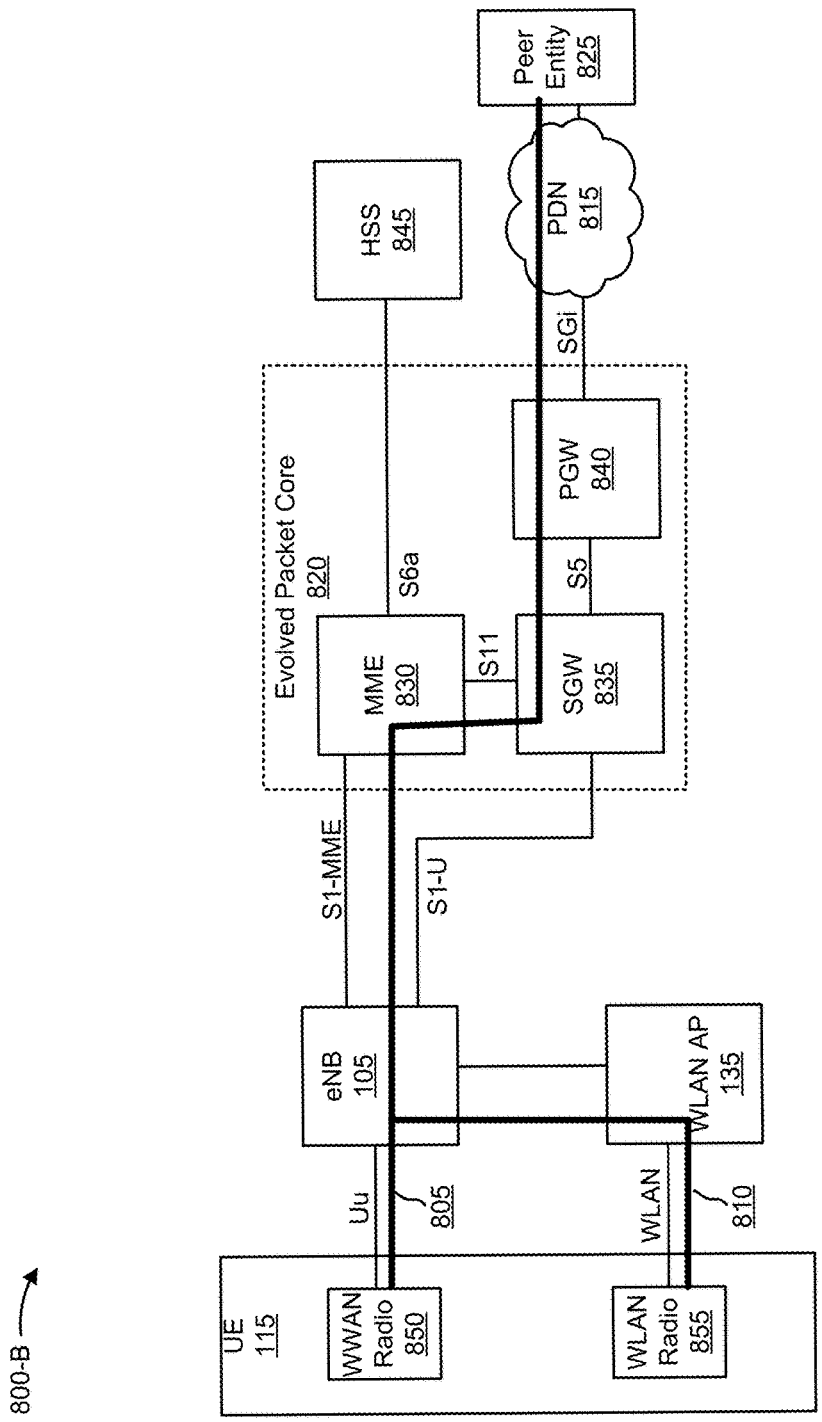

FIGS. 8A and 8B are diagrams illustrating examples of data paths between a UE and a packet data network (PDN), in accordance with various aspects of the present disclosure. Data paths 805, 810 are shown within the context of a wireless communication system 800-A, 800-B that concurrently uses WLAN (e.g., Wi-Fi) and WWAN (e.g., LTE) radio access technologies. In each example, the wireless communication system 800-A and 800-B, shown in FIGS. 8A and 8B, respectively, may include an eNB 105, a multi-mode UE 115, a WLAN AP 135, a PDN 815, an evolved packet core (EPC) 820, and a peer entity 825. The EPC 820 of each example may include a mobility management entity (MME) 830, a serving gateway (SGW) 835, and a PDN gateway (PGW) 840. A home subscriber system (HSS) 845 may be communicatively coupled with the MME 830. The UE 115 of each example may include a WWAN radio (e.g., an LTE radio) 850 and a WLAN radio (e.g., a Wi-Fi radio) 855. These elements may represent aspects of one or more of their counterparts described above with reference to the previous Figures.

Referring specifically to FIG. 8A, the eNB 105 and the WLAN AP 135 may be capable of providing the UE 115 with concurrent access to the PDN 815 (or different PDNs 815) using one or more LTE component carriers or one or more WLAN component carriers, described above in connection with FIG. 7. Using this access to the PDN(s) 815, the UE 115 may communicate with the peer entity 825 or multiple peer entities 825. The eNB 105 may provide access to the PDN(s) 815 through the EPC 820 (e.g., via data path 805), and the WLAN AP 135 may provide direct access to the PDN (e.g., via data path 810).

The MME 830 may be the control node that processes the signaling between the UE 115 and the EPC 820. Generally, the MME 830 may provide bearer and connection management. The MME 830 may, therefore, be responsible for idle mode UE tracking and paging, bearer activation and deactivation, and SGW selection for the UE 115. The MME 830 may communicate with the eNB 105 over an S1-MME interface. The MME 830 may additionally authenticate the UE 115 and implement Non-Access Stratum (NAS) signaling with the UE 115.

The HSS 845 may, among other functions, store subscriber data, manage roaming restrictions, manage accessible access point names (APNs) for a subscriber, and associate subscribers with MMEs 830. The HSS 845 may communicate with the MME 830 over an S6a interface defined by the Evolved Packet System (EPS) architecture standardized by the 3GPP organization.

In some aspects, all user IP packets transmitted over LTE may be transferred through eNB 105 to the SGW 835, which may be connected to the PGW 840 over an S5 signaling interface and to the MME 830 over an S11 signaling interface. The SGW 835 may reside in the user plane and act as a mobility anchor for inter-eNB handovers and handovers between different access technologies.

The PGW 840 may provide UE IP address allocation as well as other functions. The PGW 840 may provide connectivity to one or more external packet data networks, such as PDN 815, over an SGi signaling interface. The PDN 815 may include the Internet, an Intranet, an IP Multimedia Subsystem (IMS), a Packet-Switched (PS) Streaming Service (PSS), and/or other types of PDNs.

In some aspects, user plane data between the UE 115 and the EPC 820 may traverse the same set of one or more EPS bearers, irrespective of whether the traffic flows over data path 805 of the WWAN link or data path 810 of the WLAN link. Signaling or control plane data related to the set of one or more EPS bearers may be transmitted between the WWAN radio 850 of the UE 115 and the MME 830 of the EPC 820, by way of the eNB 105.

FIG. 8B illustrates an example system 800-B in which the eNB 105 and WLAN AP 135 are co-located or otherwise in high-speed communication with each other. In this example, EPS bearer-related data between the UE 115 and the WLAN AP 135 may be routed to the eNB 105, and then to the EPC 820. In this way, all EPS bearer-related data may be forwarded along the same path between the eNB 105, the EPC 820, the PDN(s) 815, and the peer entity or entities 825.

While aspects of FIG. 8A and FIG. 8B have been described with respect to LTE and Wi-Fi, similar aspects regarding concurrent usage, data aggregation, and/or convergence may also be implemented with respect to UMTS, New Radio, other local area networks, or other similar system or network wireless communications radio technologies. Furthermore, FIGS. 8A and 8B are provided as examples. Other examples are possible and may differ from what was described in connection with FIGS. 8A and 8B.

A UE may have limited resources, such as RF resources, baseband resources, carriers, MIMO layers, antennas, radios, modems, etc. for wireless communication. In some cases, the UE may communicate via multiple different RATs concurrently, such as a WWAN RAT and a WLAN RAT, and may need to share resources among the RATs. Techniques described herein may be used to increase UE performance when UE resources are shared among multiple RATs.

Figure 9:
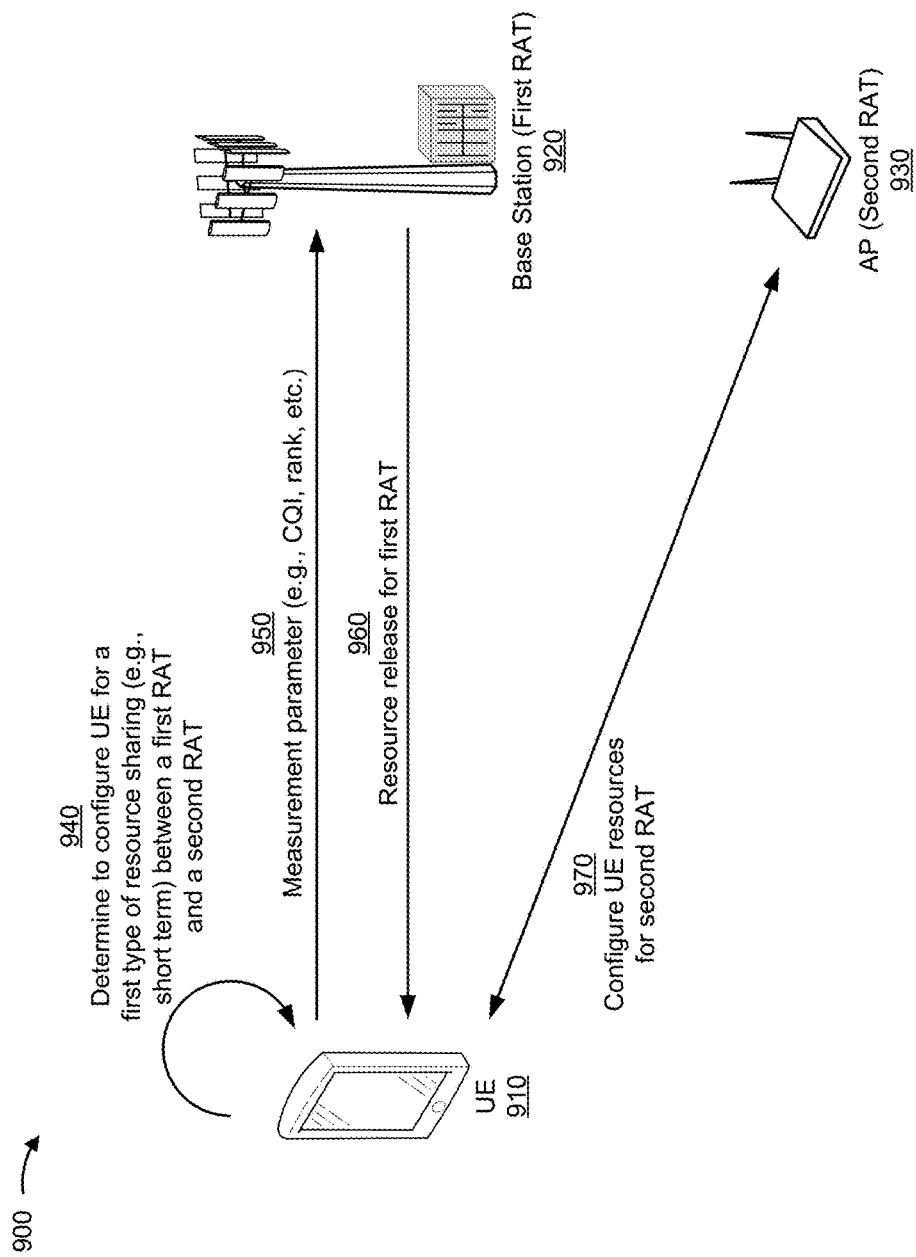
FIGS. 9-12 are diagrams illustrating examples of concurrent resource usage for WWAN and WLAN, in accordance with various aspects of the present disclosure.

FIG. 9 is a diagram illustrating an example 900 of concurrent resource usage for WWAN and WLAN, in accordance with various aspects of the present disclosure. As shown in FIG. 9, a UE 910 (e.g., which may correspond to one or more of the UE 115, 250, 615, and/or the like) may communicate with a base station 920 (e.g., which may correspond to the base station/eNB 105, 210, 230, 610, and/or the like) and/or an access point 930 (e.g., the WLAN access point 135 and/or the like). The base station 920 may be associated with a first RAT, such as a WWAN RAT (e.g., LTE), and one or more resources of UE 910 may be configured for use with the first RAT. The access point 930 may be associated with a second RAT, such as a WLAN RAT (e.g., Wi-Fi).

As shown by reference number 940, the UE 910 may determine to configure the UE 910 for a first type of resource sharing between the first RAT and the second RAT. In some aspects, the first type of resource sharing may include a short term resource sharing where the UE 910 is expected to share resources between the first RAT and the second RAT for a relatively short duration of time (e.g., seconds or minutes). In some aspects, the short term resource sharing may be triggered by a first application executing on the UE, such as an application requesting download or upload of a burst of data. As used herein, a resource or a UE resource may refer to an RF resource (e.g., an RF processor, etc.), a baseband resource (e.g., a baseband processor, etc.), an RF carrier (e.g., a component carrier 710, a component carrier 720, etc.), a MIMO layer and/or a MIMO component (e.g., a MIMO detector 656, a MIMO processor 666), an antenna, a radio (e.g., WWAN radio 850, WLAN radio 855, etc.), a modem, one or more components of a receiver chain, one or more components of a transmitter chain, one or more components of UE 615 shown in FIG. 6, and/or the like, used for wireless communication.

As shown by reference number 950, based at least in part on determining to configure the UE 910 for the first type of resource sharing, the UE 910 may report a measurement parameter to the base station 920. Reporting the measurement parameter may cause at least one UE resource, of the one or more UE resources being used for the first RAT, to be released from the first RAT so that the at least one UE resource can be used for the second RAT. For example, the UE 910 may report a relatively low channel quality indicator (CQI) value, a relatively low rank value, and/or the like. In some aspects, the base station 920 may transmit a message to the UE 910 to cause the one or more resources to be released from the first RAT. Additionally, or alternatively, the UE 910 may stop using the one or more resources on the first RAT (e.g., without explicitly receiving a message from the base station 920 to release the one or more resources).

In some aspects, the UE 910 may compare the amount of resources being used for the first RAT to a threshold (e.g., a default threshold for the first RAT, a maximum resource configuration for the first RAT, and/or the like). If the UE 910 is using more than the threshold amount of resources for the first RAT, then the UE 910 may report the measurement parameter to cause at least one UE resource of the first RAT to be released, as described above. If the UE 910 is using less than the threshold amount of resources for the first RAT, then the UE 910 may share resources between the first RAT and the second RAT in a manner described below in connection with FIG. 10.

As shown by reference number 960, based at least in part on receiving the measurement parameter from the UE 910, the base station 920 may release UE resource(s) from the first RAT. In some aspects, the base station 920 may release one or more secondary cells (Scells) used for carrier aggregation with the UE 910. In some aspects, the base station 920 may maintain a primary cell (PCell) used to communicate with the UE 910.

As shown by reference number 970, the UE 910 may configure the released UE resource(s) for use with the second RAT, such as for communicating with the access point 930. Because the released UE resource(s) are no longer used by the UE 910 to communicate with the base station 920, the UE 910 may configure these UE resource(s) for use with the second RAT to permit concurrent WWAN and WLAN communication and improve UE throughput. In some aspects, the UE 910 may periodically determine to change a configuration of the UE 910, and may send additional measurement parameters based on the determination(s). In this way, the UE 910 may adjust for changing channel and/or traffic patterns.

As indicated above, FIG. 9 is provided as an example. Other examples are possible and may differ from what was described in connection with FIG. 9.

Figure 10:
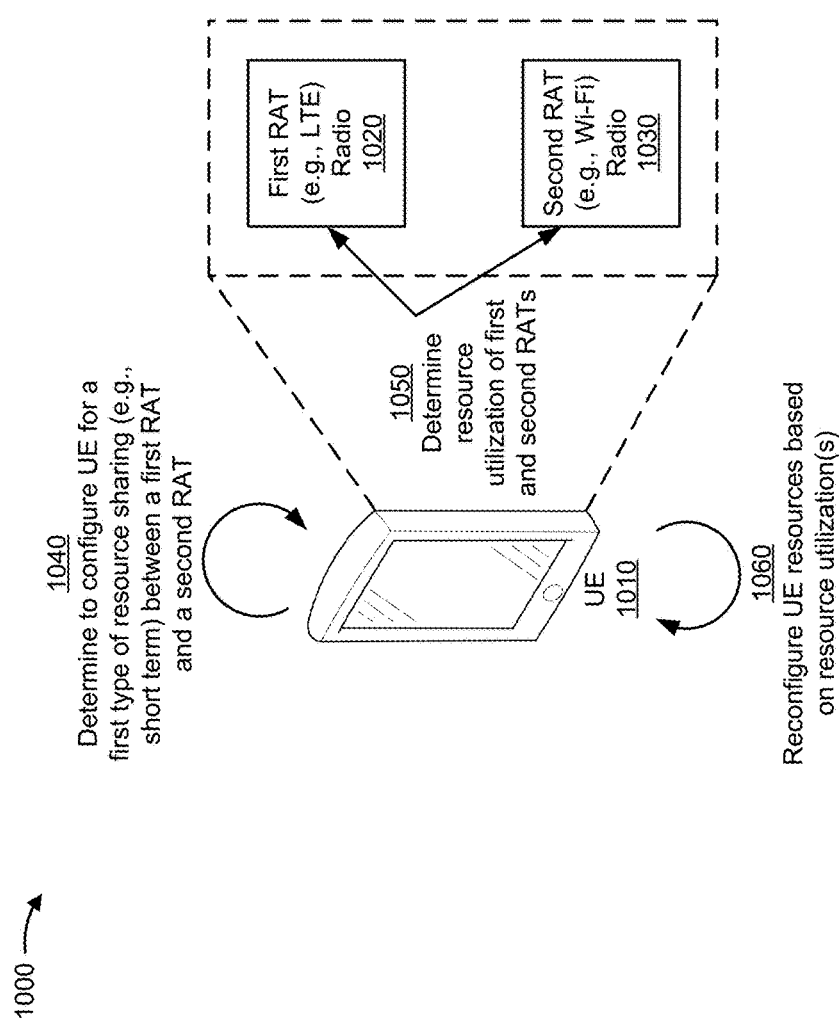

FIG. 10 is a diagram illustrating an example 1000 of concurrent resource usage for WWAN and WLAN, in accordance with various aspects of the present disclosure. As shown in FIG. 10, a UE 1010 (e.g., which may correspond to one or more of the UE 115, 250, 615, 910, and/or the like) may include a first radio 1020 for a first RAT (e.g., WWAN, LTE, and/or the like) and a second radio 1030 for a second RAT (e.g., WLAN, Wi-Fi, and/or the like). In some aspects, the first radio 1020 may correspond to WWAN radio 850, and the second radio 1030 may correspond to WLAN radio 855, described above in connection with FIGS. 8A and 8B.

As shown by reference number 1040, the UE 1010 may determine to configure the UE 1010 for a first type of resource sharing between the first RAT (e.g., the WWAN and/or LTE RAT) and a second RAT (e.g., a WLAN and/or Wi-Fi RAT). In some aspects, the first type of resource sharing may include a short term resource sharing where the UE 1010 is expected to share resources between the first RAT and the second RAT for a relatively short duration of time (e.g., seconds or minutes). In some aspects, the short term resource sharing may be triggered by a first application executing on the UE, such as an application requesting download or upload of a burst of data.

As shown by reference number 1050, based at least in part on determining to configure the UE 1010 for the first type of resource sharing, the UE 1010 may determine a first resource utilization for the first RAT and a second resource utilization for the second RAT. A resource utilization may indicate an amount and/or a percentage of UE resources being used for a corresponding RAT. In some aspects, the UE 1010 may compare the amount of resources being used for the first RAT to a threshold (e.g., a default threshold for the first RAT, a maximum resource configuration for the first RAT, and/or the like). If the UE 1010 is using less than the threshold amount of resources for the first RAT, then the UE 1010 may determine the resource utilizations for the first RAT and the second RAT, and may reconfigure UE resources based at least in part on the resource utilizations. If the UE 1010 is using more than the threshold amount of resources for the first RAT, then the UE 1010 may report a measurement parameter to cause at least one UE resource of the first RAT to be released, as described above in connection with FIG. 9.

As shown by reference number 1060, based at least in part on determining the resource utilizations, the UE 1010 may reconfigure UE resource(s) for use with the first RAT and/or the second RAT. In some aspects, if a first resource utilization for the first RAT is less than a first threshold, and a second resource utilization for the second RAT is greater than a second threshold and the second RAT is capable of using more UE resources, then the UE 1010 may reconfigure one or more UE resources from a first configuration where the UE resource(s) are allocated to the first RAT to a second configuration where the UE resource(s) are allocated to the second RAT. In some aspects, if a first resource utilization for the first RAT is greater than a first threshold, and a second resource utilization for the second RAT is less than a second threshold and the first RAT is capable of using more UE resources, then the UE 1010 may reconfigure one or more UE resources from a second configuration where the UE resource(s) are allocated to the second RAT to a first configuration where the UE resource(s) are allocated to the first RAT. In some aspects, UE resources may be released by reporting a measurement parameter, as described elsewhere herein.

As indicated above, FIG. 10 is provided as an example. Other examples are possible and may differ from what was described in connection with FIG. 10.

Figure 11:
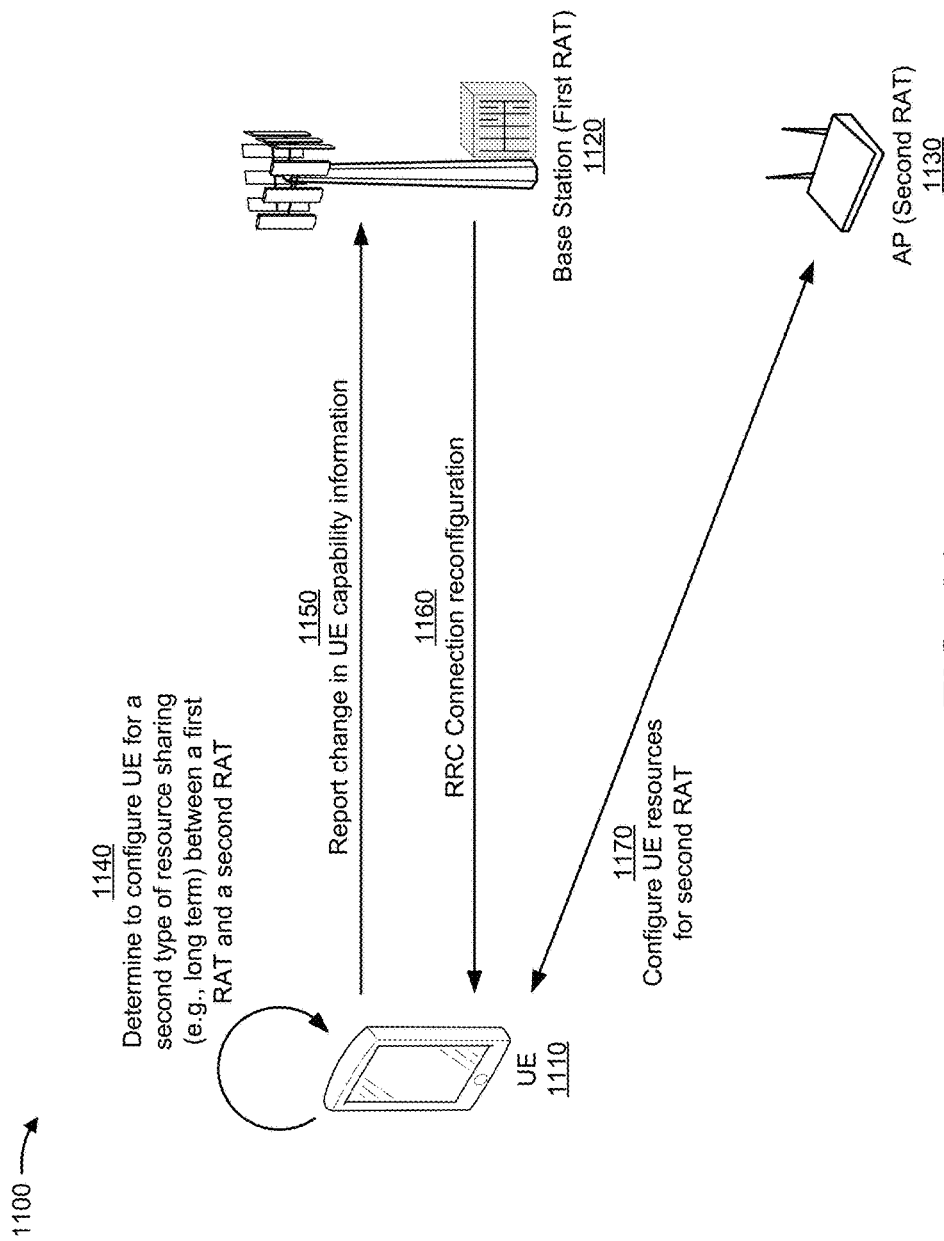

FIG. 11 is a diagram illustrating an example 1100 of concurrent resource usage for WWAN and WLAN, in accordance with various aspects of the present disclosure. As shown in FIG. 11, a UE 1110 (e.g., which may correspond to one or more of the UE 115, 250, 615, 910, 1010, and/or the like) may communicate with a base station 1120 (e.g., which may correspond to the base station/eNB 105, 210, 230, 610, 920, and/or the like) and/or an access point 1130 (e.g., the WLAN access point 135 and/or the like). The base station 1120 may be associated with a first RAT, such as a WWAN RAT (e.g., LTE), and one or more resources of UE 1110 may be configured for use with the first RAT. The access point 1130 may be associated with a second RAT, such as a WLAN RAT (e.g., Wi-Fi).

As shown by reference number 1140, the UE 1110 may determine to configure the UE 1110 for a second type of resource sharing between the first RAT and the second RAT. In some aspects, the second type of resource sharing may include a long term resource sharing where the UE 1110 is expected to share resources between the first RAT and the second RAT for a relatively long duration of time (e.g., hours). In some aspects, the long term resource sharing may be triggered by a second application executing on the UE, such as a mobile hotspot (e.g., tethering) application.

As shown by reference number 1150, based at least in part on determining to configure the UE 1110 for the second type of resource sharing, the UE 1110 may report a change in UE capability to the base station 920. Reporting the change in capability may cause at least one UE resource, of the one or more UE resources being used for the first RAT, to be released from the first RAT so that the at least one UE resource can be used for the second RAT. For example, the UE 1110 may report a change in a carrier aggregation capability, a change in an antenna capability, and/or the like. In some aspects, the UE 1110 may report the change in capability using a UE capability information message. For example, the UE 1110 may detach from the first RAT, and may reattach to the first RAT. During the reattachment, the UE 1110 may report a different capability (e.g., to reflect the UE resources to be used for the second RAT) in the UE capability information message. In some aspects, the UE 1110 may use historical data for capability reporting. For example, if a particular cell has a history of granting a particular number or fewer resources for carrier aggregation, then the UE 1110 may not report a capability for more than the particular number of resources.

In some aspects, the UE 1110 may compare the amount of resources being used for the first RAT to a threshold (e.g., a default threshold for the first RAT, a maximum resource configuration for the first RAT, and/or the like). If the UE 1110 is using more than the threshold amount of resources for the first RAT, then the UE 1110 may report the change in capability without waiting for termination of an existing radio resource control (RRC) connection. In this way, the UE 1110 may quickly make UE resources available for the second RAT. If the UE 1110 is using less than the threshold amount of resources for the first RAT, then the UE 1110 may report the change in capability after an existing RRC connection is terminated. In this way, the UE 1110 may make UE resources available for the second RAT without disrupting an existing connection.

As shown by reference number 1160, based at least in part on receiving the UE capability information from the UE 1110, the base station 1120 may transmit an RRC connection reconfiguration message to the UE 1110 to cause the UE 1110 to reconfigure UE resource(s) for the first RAT. In some aspects, the RRC connection reconfiguration message may cause the UE 1110 to release at least one UE resource from the first RAT. In some aspects, the RRC connection reconfiguration message may cause the UE 1110 to add a UE resource for the first RAT. In some aspects, the base station 1120 may release one or more secondary cells (SCells) used for carrier aggregation with the UE 1110. In some aspects, the base station 1120 may maintain a primary cell (PCell) used to communicate with the UE 1110.

As shown by reference number 1170, the UE 1110 may configure the released UE resource(s) for use with the second RAT, such as for communicating with the access point 1130. Because the released UE resource(s) are no longer used by the UE 1110 to communicate with the base station 1120 via the first RAT, the UE 1110 may configure these UE resource(s) for use with the second RAT to permit concurrent WWAN and WLAN communication and improve UE throughput.

As indicated above, FIG. 11 is provided as an example. Other examples are possible and may differ from what was described in connection with FIG. 11.

Figure 12:
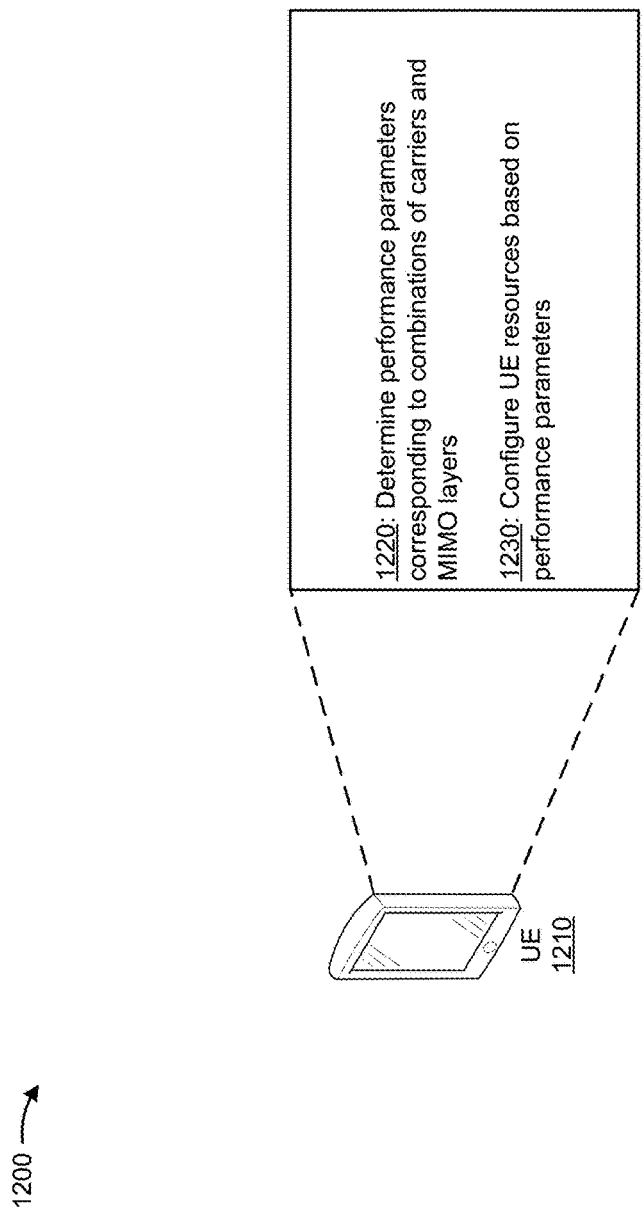

FIG. 12 is a diagram illustrating an example 1200 of concurrent resource usage for WWAN and WLAN, in accordance with various aspects of the present disclosure. As shown in FIG. 12, example 1200 may include a UE 1210 (e.g., which may correspond to one or more of the UE 115, 250, 615, 910, 1010, 1110, and/or the like). As described above in connection with FIGS. 9-11, the UE 1210 may determine to configure the UE 1210 for a first type of resource sharing (e.g., short term resource sharing) or a second type of resource sharing (e.g., long term resource sharing) between a first RAT and a second RAT, and may configure one or more UE resources based at least in part on this determination. To configure the UE resources for improved performance (e.g., higher throughput, higher quality, etc.), the UE 1210 may determine performance parameters for combinations of carriers and MIMO layers to potentially be reconfigured, and may configure the UE resources based at least in part on the performance parameters, as described below.

As shown by reference number 1220, the UE 1210 may determine performance parameters corresponding to combinations of carriers and MIMO layers. As shown by reference number 1230, the UE 1210 may configure UE resources for the first RAT and/or the second RAT based at least in part on the performance parameters. Example performance parameters include an estimated downlink throughput parameter, an estimated uplink throughput parameter, an overall estimated throughput parameter (e.g., determined using the estimated downlink throughput parameter and the estimated uplink throughput parameter), and/or the like. Examples of these performance parameters are described in more detail below. In some aspects, the UE 1210 may determine performance parameters based at least in part on determining to configure the UE 1210 for a first type of resource sharing (e.g., short term resource sharing).

In some aspects, when determining a performance parameter for a carrier (reference number 1220), the UE 1210 may assign a weight to each carrier, and the weight may correspond to a performance parameter for the carrier, such as an estimated throughput for the carrier. Similarly, if the UE 1210 is capable of configuring different numbers of MIMO layers per carrier, then the UE 1210 may assign a weight for each possible combination of MIMO layers and carriers, and may maintain the carrier(s) and/or MIMO layer(s) (e.g., for use by first RAT) that result in the best performance according to the performance parameter (e.g., the highest throughput). In this case, the UE 1210 may release the carriers and/or MIMO layers with the lower performance parameters (e.g., for use by the second RAT).

For example, if the UE 1210 is configured with two SCells (e.g., a first SCell and a second SCell) with four MIMO layers per SCell, and is to surrender resources to another RAT, the UE 1210 may determine performance parameters for the first SCell with four MIMO layers (e.g., surrendering the second SCell with four MIMO layers), the second SCell with four MIMO layers (e.g., surrendering the first SCell with four MIMO layers), and both SCells with two MIMO layers each (e.g., surrendering two MIMO layers per SCell). In some aspects, the UE 1210 may analyze different options of N carriers with $k_i$ MIMO layers, where $k_i$ represents a number of MIMO layers configured on carrier i.

The estimated throughput may represent an estimated amount of data capable of being carried on a particular combination of carrier(s) and/or MIMO layer(s). In some aspects, the UE 1210 may determine the estimated throughput based at least in part on a current amount of data being carried on a carrier and/or MIMO layer, a channel condition (e.g., using a CQI, a rank, etc.) associated with a carrier and/or MIMO layer, a utilization and/or load of a carrier and/or MIMO layer, and/or the like. Thus, the estimated throughput may take into account a current amount of data being carried by a carrier and/or MIMO layer as well as an additional amount of data capable of being carried by the carrier and/or MIMO layer (e.g., based on a channel condition, a utilization, a load, and/or the like).

When the performance parameter is the estimated uplink throughput parameter, the UE 1210 may calculate an uplink weight for one or more carriers, and may use the uplink weight(s) to calculate the estimated uplink throughput parameter. For example, the UE 1210 may calculate the estimated uplink throughput parameter as follows:

$$\text{Estimated } UL \text{ throughput} = \sum_{i \in N \text{ carriers}} UL \text{ weight of carrier } i$$

To calculate the uplink weight for a carrier i, the UE 1210 may calculate:

$$UL \text{ weight of carrier } i = \begin{cases} \text{true estimate;} & \text{if } k_i \geq \text{total number of layers configured on carrier } i \\ 1 \text{ layer estimate;} & \text{if } k_i = 1 \end{cases}$$

When the performance parameter is the estimated downlink throughput parameter, the UE 1210 may calculate a downlink weight for one or more carriers, and may use the downlink weight(s) to calculate the estimated downlink throughput parameter. For example, the UE 1210 may calculate the estimated downlink throughput parameter as follows:

$$\text{Estimated } DL \text{ throughout} = \sum_{i \in N \text{ carriers}} DL \text{ weight of carrier } i$$

To calculate the downlink weight for a carrier i, the UE 1210 may calculate:

$$DL \text{ weight of carrier } i = \begin{cases} \text{true estimate;} & \text{if } k_i \geq \text{total number of layers configured on carrier } i \\ 2 \text{ layer estimate;} & \text{if } k_i = 2 \\ 1 \text{ layer estimate;} & \text{if } k_i = 1 \end{cases}$$

In the above equation, the true estimate refers to the estimated throughput using the number of MIMO layers currently configured on carrier i (e.g., 4 MIMO layers in this example), the 2 layer estimate refers to the estimated throughput when two MIMO layers are configured on carrier i, and the 1 layer estimate refers to the estimated throughput when one MIMO layer is configured on carrier i. The above numbers of MIMO layers are provided as examples, and other numbers of MIMO layers are possible.

In the above equation, the true estimate refers to the estimated throughput using the number of MIMO layers currently configured on carrier i (e.g., 2 MIMO layers in this example), and the 1 layer estimate refers to the estimated throughput when one MIMO layer is configured on carrier i. These numbers of MIMO layers are provided as examples, and other numbers of MIMO layers are possible.

In some aspects, when calculating the estimated downlink throughput parameter, the UE 1210 may account for cross-carrier scheduling. For example, the UE 1210 may calculate the estimated downlink throughput parameter using one or more downlink weights, as follows:

$$\text{Estimated } DL \text{ throughput} = \sum_{i \in N \text{ carriers}} DL \text{ weight of carrier } i$$

To account for cross-carrier scheduling when calculating the downlink weight for a carrier i, the UE 1210 may calculate:

$$DL \text{ weight} = \sum_{i \in N \text{ carriers}} \left[ (DL \text{ weight of carrier } i \times I) + \sum_{j \in \text{other carriers scheduled by carrier } i} DL \text{ weight of carrier } j \right]$$

In the above equation, I may be set to 1 if carrier i schedules itself or if the carrier that schedules carrier i is not included in the subset of N carriers being analyzed, and may be set to zero otherwise. This prevents the downlink weight for carrier i from being counted twice if carrier i schedules itself or is scheduled by a carrier not included in the subset. The DL weight of carrier i and carrier j may be determined as described above (e.g., the true estimate, the 2 layer estimate, the 1 layer estimate, etc.). In this way, the UE 1210 may account for the throughput of carrier i and other carriers scheduled by carrier i when calculating the estimated throughput.

Similarly, when calculating the estimated uplink throughput parameter, the UE 1210 may account for cross-carrier scheduling. For example, the UE 1210 may calculate the estimated uplink throughput parameter using one or more uplink weights, as follows:

$$\text{Estimated } UL \text{ throughput} = \sum_{i \in N \text{ carriers}} UL \text{ weight of carrier } i$$

To account for cross-carrier scheduling when calculating the uplink weight for a carrier i, the UE 1210 may calculate:

$$UL \text{ weight} = \sum_{i \in N \text{ carriers}} \left[ (UL \text{ weight of carrier } i \times I) + \sum_{j \in \text{other carriers with activated } UL \text{ scheduled by carrier } i} UL \text{ weight of carrier } j \right]$$

In the above equation, I may be set to 1 if carrier i schedules itself or if the carrier that schedules carrier i is not included in the subset of N carriers being analyzed, and may be set to zero otherwise. This prevents the downlink weight for carrier i from being counted twice if carrier i schedules itself or is scheduled by a carrier not included in the subset. The UL weight of carrier i and carrier j may be determined as described above (e.g., the true estimate, the 1 layer estimate, etc.). In this way, the UE 1210 may account for the throughput of carrier i and other carriers scheduled by carrier i when calculating the estimated throughput.

When the performance parameter is the overall estimated throughput parameter, the UE 1210 may combine the estimated downlink throughput parameter and the estimated uplink throughput parameter. For example, the UE 1210 may sum the estimated downlink throughput parameter and the estimated uplink throughput parameter to calculate the overall estimated throughput parameter. As another example, the UE 1210 may bias the estimated downlink throughput parameter and/or the estimated uplink throughput parameter (e.g., by assigning a weight to the estimated downlink throughput parameter and/or the estimated uplink throughput parameter). In this way, the UE 1210 may improve performance depending on an application that is using the first RAT. For example, if an application using WWAN is primarily used for downlink data, then the UE 1210 may assign a higher weight to the estimated downlink throughput parameter, as compared to the estimated uplink throughput parameter, when calculating the overall estimated throughput parameter. Similarly, if an application using WWAN is primarily used for uplink data, then the UE 1210 may assign a higher weight to the estimated uplink throughput parameter, as compared to the estimated downlink throughput parameter, when calculating the overall estimated throughput parameter.

In some aspects, when configuring the one or more UE resources based on the performance parameters (reference number 1230), the UE 1210 may release one or more SCells while retaining the PCell. However, the UE 1210 may report a measurement parameter to free up UE resources on the PCell (e.g., by reporting a low rank and/or a low CQI on the PCell). In some aspects, the UE 1210 may assign a higher weight to an SCell that carries evolved Multimedia Broadcast Multicast Services (eMBMS) data to prevent eMBMS data from being dropped, and to enhance a user experience.

In some aspects, when one or more carriers use higher order Rx diversity management (HORxD), the UE 1210 may assign a higher weight to the carriers involved in the HORxD. Otherwise, throughput benefits of HORxD may be lost. For example, if the PCell carries high priority applications using HORxD with a particular SCell, then the UE 1210 may assign a higher weight to that SCell. In some aspects, the UE 1210 may maintain a carrier that permits the PCell to maintain a highest order diversity. In some aspects, the UE 1210 may prevent a configuration for concurrent RAT usage to maintain HORxD.

Additionally, or alternatively, the UE 1210 may assign weights such that the loss of a MIMO layer is more likely than the loss of a carrier. In some cases, dropping a carrier may be more disruptive than dropping a MIMO layer. Thus, by prioritizing carriers over MIMO layers, the UE 1210 may reduce disruptions, improve throughput, and enhance a user experience.

As indicated above, FIG. 12 is provided as an example. Other examples are possible and may differ from what was described in connection with FIG. 12.

Figure 13:
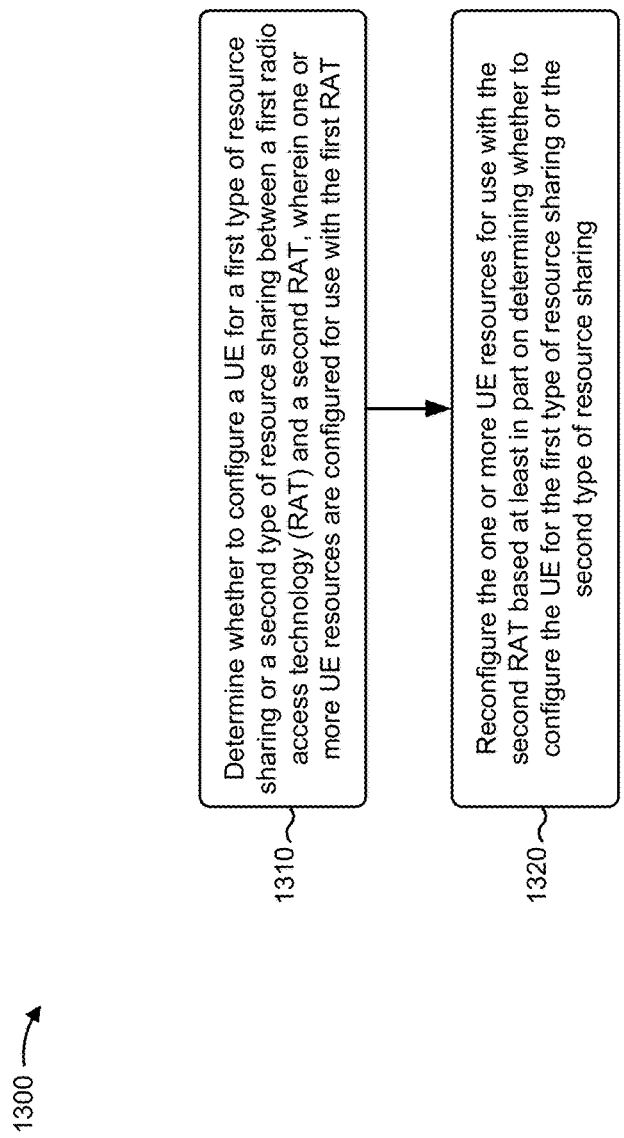
FIGS. 13-15 are flow charts of example processes for concurrent resource usage for WWAN and WLAN, in accordance with various aspects of the present disclosure.

FIG. 13 is a flow chart of an example process 1300 for concurrent resource usage for WWAN and WLAN, in accordance with various aspects of the present disclosure. Example process 1300 may be performed by a UE (e.g., the UE 115, 250, 615, 910, 1010, 1110, 1210, the apparatus 1602/1602', and/or the like).

As shown in FIG. 13, in some aspects, process 1300 may include determining whether to configure a UE for a first type of resource sharing or a second type of resource sharing between a first radio access technology (RAT) and a second RAT, wherein one or more UE resources are configured for use with the first RAT (block 1310). For example, the UE may determine whether to configure the UE for a first type of resource sharing or a second type of resource sharing. In some aspects, the first type of resource sharing is a short term resource sharing and the second type of resource sharing is a long term resource sharing. In some aspects, the short term resource sharing is triggered by a first application executing on the UE and the long term resource sharing is triggered by a second application executing on the UE. In some aspects, the first RAT is a WWAN RAT and the second RAT is a WLAN RAT. In this way, the UE may share resources (e.g., by reconfiguring UE resources) between different RATs (e.g., a WWAN RAT and a WLAN RAT), as described above in connection with FIGS. 9-12. For example, the UE may release UE resources used for a first RAT and may use those UE resources for a second RAT, may add resources to the first RAT and release those resources from the second RAT, and/or the like.

As further shown in FIG. 13, in some aspects, process 1300 may include reconfiguring the one or more UE resources for use with the second RAT based at least in part on determining whether to configure the UE for the first type of resource sharing or the second type of resource sharing (block 1320). For example, the UE may reconfigure one or more UE resources, previously used for the first RAT, for the second RAT. In some aspects, the UE may report a measurement parameter that causes at least one UE resource, of the one or more UE resources, to be released from the first RAT when the UE determines that the UE is to be configured for a first type of resource sharing, such as short term resource sharing. In some aspects, the UE may report a measurement parameter that causes at least one UE resource, of the one or more UE resources, to be released from the first RAT when the UE determines that the UE is to be configured for a second type of resource sharing, such as long term resource sharing.

In some aspects, the UE may reconfigure one or more UE resources based at least in part on one or more resource utilizations corresponding to one or more RATs. For example, the UE may determine a first resource utilization associated with the first RAT when the UE determines that the UE is to be configured for the short term resource sharing, may determine a second resource utilization associated with the second RAT when the UE determines that the UE is to be configured for the short term resource sharing, and may reconfigure the one or more UE resources based at least in part on the first resource utilization and the second resource utilization.

In some aspects, the UE may report a change in UE capability associated with the one or more UE resources, wherein the change in UE capability is reported when the UE determines that the UE is to be configured for the long term resource sharing. In some aspects, the change in capability may cause at least one of a release of at least one UE resource, of the one or more UE resources, from the first RAT, or an addition of a UE resource for the first RAT.

In some aspects, the UE may determine a plurality of performance parameters corresponding to a plurality of combinations of carriers and MIMO layers of the UE, and may reconfigure the one or more UE resources based at least in part on the plurality of performance parameters. In some aspects, the plurality of performance parameters include at least one of an estimated downlink throughput parameter, an estimated uplink throughput parameter, an overall estimated throughput parameter (e.g., determined using the estimated downlink throughput parameter and the estimated uplink throughput parameter), and/or the like, or any combination thereof.

Although FIG. 13 shows example blocks of process 1300, in some aspects, process 1300 may include additional blocks, fewer blocks, different blocks, or differently arranged blocks than those depicted in FIG. 13. Additionally, or alternatively, two or more of the blocks of process 1300 may be performed in parallel.

Figure 14:
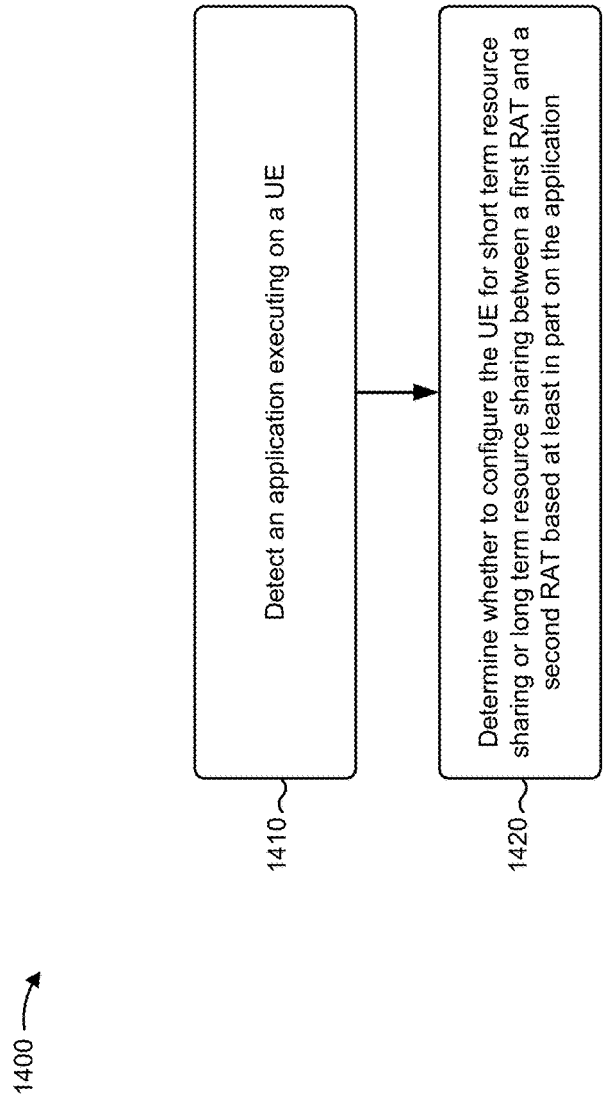

FIG. 14 is a flow chart of an example process 1400 for concurrent resource usage for WWAN and WLAN, in accordance with various aspects of the present disclosure. In some aspects, block 1310 of FIG. 13 may include process 1400 of FIG. 14. Example process 1400 may be performed by a UE (e.g., the UE 115, 250, 615, 910, 1010, 1110, 1210, the apparatus 1602/1602', and/or the like).

As shown in FIG. 14, in some aspects, process 1400 may include detecting an application executing on a UE (block 1410), and determining whether to configure the UE for short term resource sharing or long term resource sharing between a first RAT and a second RAT based at least in part on the application (block 1420). For example, the UE may detect an application that has been selected, executed, loaded, activated, initiated, and/or the like. In some aspects, when an application begins execution and/or begins performing a task, the UE may detect that the application has begun executing or performing the task, may identify the application and/or task, and/or may identify a type of the application and/or task.

In some aspects, a first application and/or task (or a first type of application and/or task) may be associated with short term resource sharing, such as an application that downloads and/or uploads content (e.g., when the size of the content is known and/or less than a threshold size), a content sharing application, an email application, a messaging application, a news application, a social media application, and/or the like. The first type of application may include applications that typically use UE resources (e.g., radio resources) for a short duration of time (e.g., less than a threshold).

Additionally, or alternatively, a second application and/or task (or a second type of application and/or task) may be associated with long term resource sharing, such as an application that downloads and/or uploads content (e.g., when the size of the content is unknown and/or greater than a threshold size), a mobile hotspot (e.g., tethering) application, a voice call application, a video call application, a gaming application, and/or the like. The second type of application may include applications that typically use UE resources (e.g., radio resources) for a long duration of time (e.g., greater than a threshold).

In some aspects, the UE may analyze usage data associated with an application to determine whether to configure the UE for short term resource sharing or long term resource sharing. Such usage data may be based on actual usage by a user, historical usage by a user, usage associated with similar users, and/or the like. For example, if a first user typically conducts video calls that are one hour or longer, then the UE may configure the UE for long term resource sharing when the first user activates a video call application. Similarly, if a second user typically conducts video calls that are less than one hour, then the UE may configure the UE for short term resource sharing when the second user activates a video call application.

As used herein, resource sharing may refer to reconfiguring an allocation of UE resources from a first RAT to a second RAT. Such reallocation may occur for a relatively short duration of time or a relatively long duration of time. In some aspects, short term resource sharing may refer to resource sharing between RATs with an expected duration that is less than or equal to a threshold (e.g., less than two hours, less than one hour, less than 30 minutes, less than 15 minutes, less than 10 minutes, less than 5 minutes, etc.). Similarly, long term resource sharing may refer to resource sharing between RATs with an expected duration that is greater than or equal to a threshold (e.g., greater than two hours, greater than one hour, greater than 30 minutes, greater than 15 minutes, greater than 10 minutes, greater than 5 minutes, etc.). The UE may reconfigure UE resources differently in these different resource sharing scenarios to enhance performance.

Although FIG. 14 shows example blocks of process 1400, in some aspects, process 1400 may include additional blocks, fewer blocks, different blocks, or differently arranged blocks than those depicted in FIG. 14. Additionally, or alternatively, two or more of the blocks of process 1400 may be performed in parallel.

Figure 15:
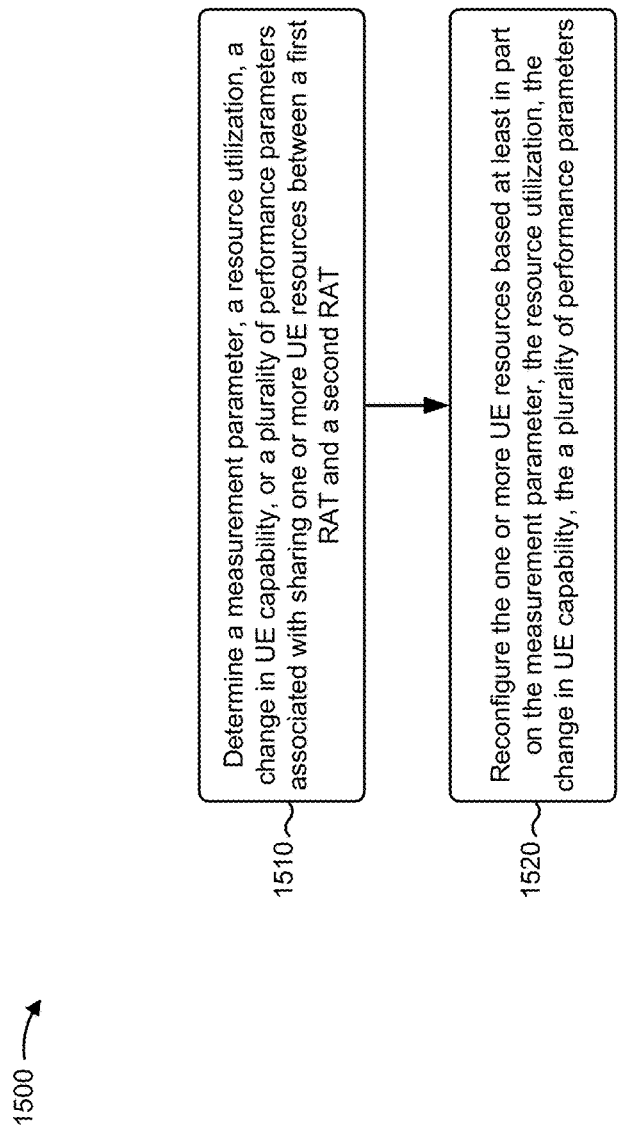

FIG. 15 is a flow chart of an example process 1500 for concurrent resource usage for WWAN and WLAN, in accordance with various aspects of the present disclosure. In some aspects, block 1320 of FIG. 13 may include process 1500 of FIG. 15. Example process 1500 may be performed by a UE (e.g., the UE 115, 250, 615, 910, 1010, 1110, 1210, the apparatus 1602/1602', and/or the like).

As shown in FIG. 15, in some aspects, process 1400 may include determining a measurement parameter, a resource utilization, a change in UE capability, or a plurality of performance parameters associated with sharing one or more UE resources between a first RAT and a second RAT (block 1510), and reconfiguring the one or more UE resources based at least in part on the measurement parameter, the resource utilization, the change in UE capability, the a plurality of performance parameters (block 1520). In some aspects, the UE may determine to configure the UE for resource sharing, as described above in connection with FIGS. 9-14. Based at least in part on this determination, the UE may, in some aspects, reconfigure one or more UE resources by reporting a measurement parameter to a base station, as described above in connection with FIG. 9. For example, the UE may report a relatively low channel quality indicator (CQI) value, a relatively low rank value, and/or the like, to a base station. In some aspects, the base station may transmit a message to the UE to cause the one or more resources to be released from the first RAT, and the UE may configure at least one released UE resource for use with the second RAT. Additionally, or alternatively, the UE may stop using the one or more resources on the first RAT (e.g., without explicitly receiving a message from the base station to release the one or more resources), and may use the one or more resources on the second RAT.

In some aspects, the UE may reconfigure one or more UE resources based at least in part on a first resource utilization for the first RAT and a second resource utilization for the second RAT, as described above in connection with FIG. 10. A resource utilization may indicate an amount and/or a percentage of UE resources being used for a corresponding RAT. In some aspects, if a first resource utilization for the first RAT is less than a first threshold, and a second resource utilization for the second RAT is greater than a second threshold and the second RAT is capable of using more UE resources, then the UE may reconfigure one or more UE resources from a first configuration where the UE resource(s) are allocated to the first RAT to a second configuration where the UE resource(s) are allocated to the second RAT. In some aspects, if a first resource utilization for the first RAT is greater than a first threshold, and a second resource utilization for the second RAT is less than a second threshold and the first RAT is capable of using more UE resources, then the UE may reconfigure one or more UE resources from a second configuration where the UE resource(s) are allocated to the second RAT to a first configuration where the UE resource(s) are allocated to the first RAT.

In some aspects, the UE may reconfigure one or more UE resources by reporting a change in capability to a base station, as described above in connection with FIG. 11. A change in capability may refer to a change in a reported carrier aggregation capability of the UE (e.g., carrier aggregation enabled or carrier aggregation disabled), a change in a reported number of carriers supported by the UE for carrier aggregation, a change in a reported number of MIMO layers supported by the UE, a change in a reported number of antennas supported by the UE, and/or the like. Reporting the change in capability may cause at least one UE resource, of the one or more UE resources being used for the first RAT, to be released from the first RAT so that the at least one UE resource can be used for the second RAT. In some aspects, the UE 1110 may report the change in capability using a UE capability information message, as described above in connection with FIG. 11.

In some aspects, the UE may reconfigure one or more UE resources based at least in part on a plurality of performance parameters associated with different combinations of carriers and/or MIMO layers, as described above in connection with FIG. 12. A performance parameter may include, for example, an estimated downlink throughput parameter, an estimated uplink throughput parameter, an overall estimated throughput parameter (e.g., determined using the estimated downlink throughput parameter and the estimated uplink throughput parameter), and/or the like, as described above in connection with FIG. 12. The UE may determine a first performance parameter for a first combination of carrier(s) and/or MIMO layer(s), may determine a second performance parameter for a second combination of carrier(s) and/or MIMO layer(s), and may determine UE resources to be reconfigured by comparing the first performance parameter and the second performance parameter, thereby improving UE performance, as described elsewhere herein.

Although FIG. 15 shows example blocks of process 1500, in some aspects, process 1500 may include additional blocks, fewer blocks, different blocks, or differently arranged blocks than those depicted in FIG. 15. Additionally, or alternatively, two or more of the blocks of process 1500 may be performed in parallel.

Figure 16:
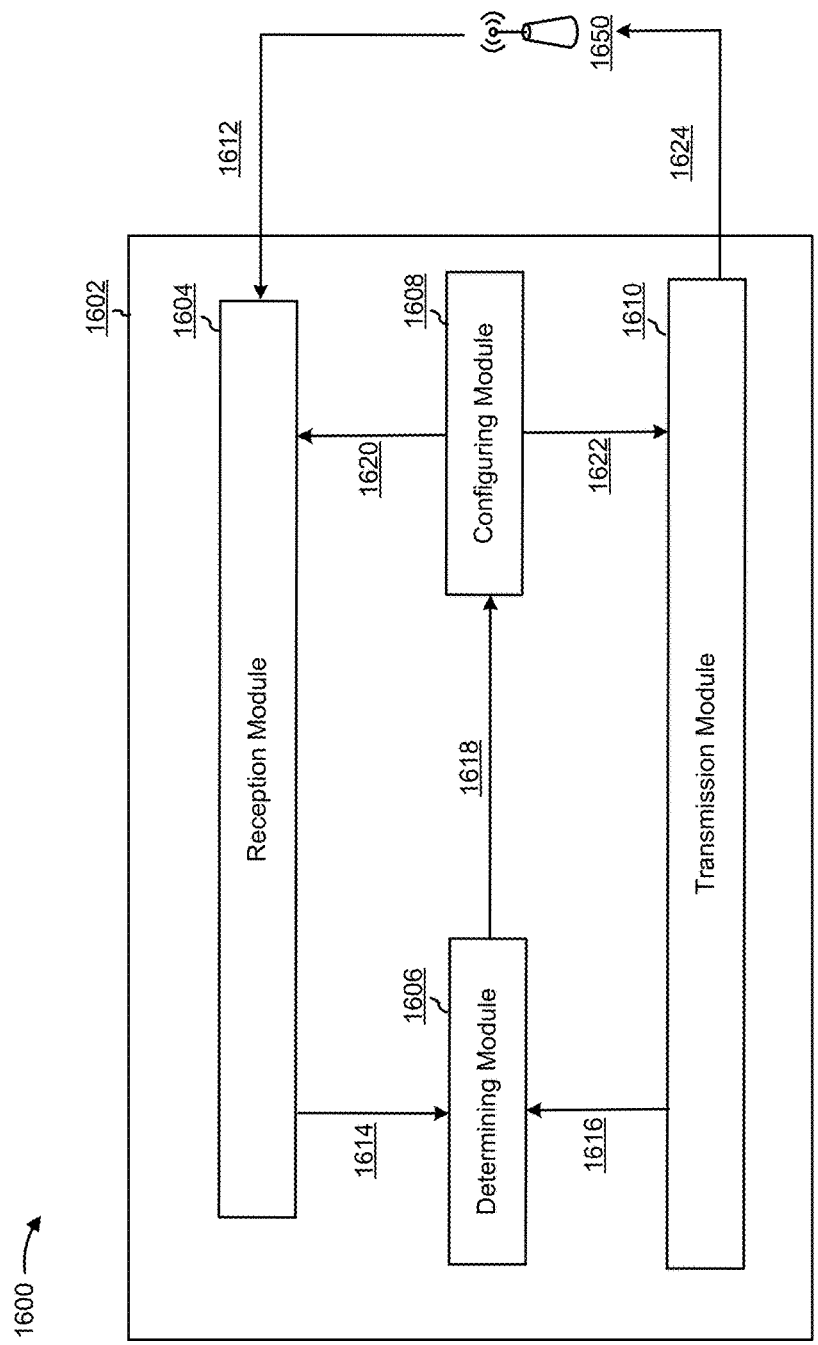
FIG. 16 is a conceptual data flow diagram illustrating the data flow between different modules/means/components in an example apparatus, in accordance with various aspects of the present disclosure.

FIG. 16 is a conceptual data flow diagram 1600 illustrating the data flow between different modules/means/components in an example apparatus 1602. The apparatus 1602 may be a UE (e.g., the UE 115, 250, 615, 910, 1010, 1110, 1210, and/or the like). In some aspects, the apparatus 1602 includes a reception module 1604, a determining module 1606, a configuring module 1608, and/or a transmission module 1610.

The reception module 1604 may receive data 1612 from an eNB and/or a WLAN AP 1650, and may provide the data 1612 to the determining module 1606 as data 1614. In some aspects, the determining module 1606 may use the data 1614 to determine whether to configure the apparatus 1602 for a first type of resource sharing or a second type of resource sharing. Additionally, or alternatively, the determining module 1606 may use other data, such as data 1616 received from the transmission module 1610 and/or data associated with an application loaded by and/or executing on apparatus 1602, to determine whether to configure the apparatus 1602 for a first type of resource sharing or a second type of resource sharing. In some aspects, the determining module 1606 may perform, for example, one or more operations described in connection with block 1310 of FIG. 13, block 1410 of FIG. 14, and/or block 1420 of FIG. 14. The determining module 1606 may provide an indication of the type of resource sharing, as data 1618, to the configuring module 1608.

The configuring module 1608 may configure one or more UE resources, such as resources associated with the reception module 1604 (e.g., using data 1620) and/or the transmission module 1610 (e.g., using data 1622), based at least in part on the data 1618. In some aspects, the configuring module 1608 may perform, for example, one or more operations described in connection with block 1320 of FIG. 13, block 1510 of FIG. 15, and/or block 1520 of FIG. 15. In some aspects, the transmission module 1610 may transmit data 1624 to the eNB and/or wireless AP 1650, such as a measurement parameter, a change in capability, and/or the like, as described above in connection with block 1510 and 1520 of FIG. 15.

The apparatus may include additional modules that perform each of the blocks of the algorithm in the aforementioned flow charts of FIGS. 13-15. As such, each block in the aforementioned flow charts of FIGS. 13-15 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

The number and arrangement of modules shown in FIG. 16 are provided as an example. In practice, there may be additional modules, fewer modules, different modules, or differently arranged modules than those shown in FIG. 16. Furthermore, two or more modules shown in FIG. 16 may be implemented within a single module, or a single module shown in FIG. 16 may be implemented as multiple, distributed modules. Additionally, or alternatively, a set of modules (e.g., one or more modules) shown in FIG. 16 may perform one or more functions described as being performed by another set of modules shown in FIG. 16.

Figure 17:
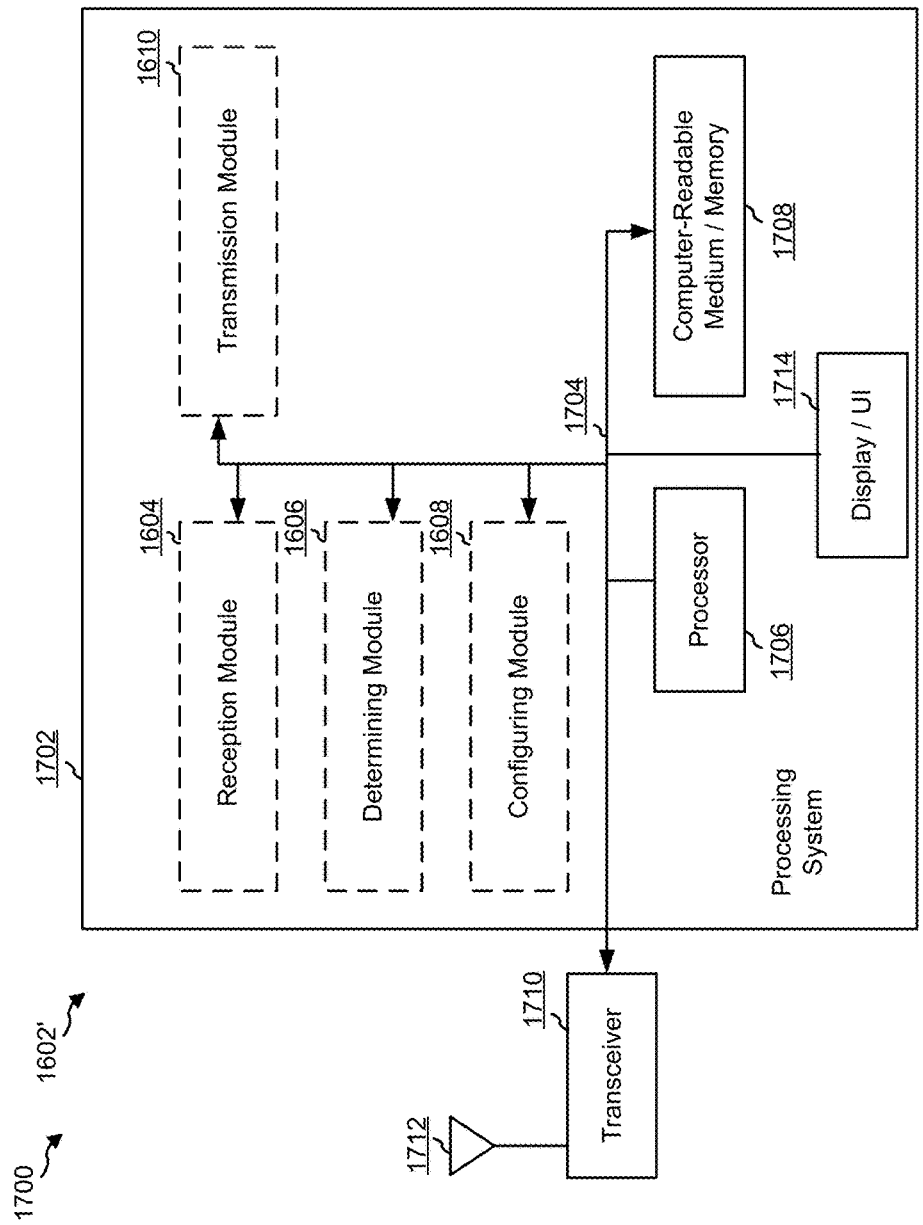
FIG. 17 is a diagram illustrating an example of a hardware implementation for an apparatus employing a processing system, in accordance with various aspects of the present disclosure.

FIG. 17 is a diagram 1700 illustrating an example of a hardware implementation for an apparatus 1602' employing a processing system 1702. The apparatus 1602' may be a UE (e.g., the UE 115, 250, 615, 910, 1010, 1110, 1210, and/or the like).

The processing system 1702 may be implemented with a bus architecture, represented generally by the bus 1704. The bus 1704 may include any number of interconnecting buses and bridges depending on the specific application of the processing system 1702 and the overall design constraints. The bus 1704 links together various circuits including one or more processors and/or hardware modules, represented by the processor 1706, the modules 1604, 1606, 1608, and 1610, and the computer-readable medium/memory 1708. The bus 1704 may also link various other circuits such as timing sources, peripherals, voltage regulators, and power management circuits, which are well known in the art, and therefore, will not be described any further. In some aspects, the apparatus 1602' includes a display 1714. The display 1714 may be used to display a user interface. One or more components of apparatus 1602' may be housed within a housing.

The processing system 1702 may be coupled to a transceiver 1710. The transceiver 1710 is coupled to one or more antennas 1712. The transceiver 1710 provides a means for communicating with various other apparatus over a transmission medium. The transceiver 1710 receives a signal from the one or more antennas 1712, extracts information from the received signal, and provides the extracted information to the processing system 1702, specifically the reception module 1604. In addition, the transceiver 1710 receives information from the processing system 1702, specifically the transmission module 1610, and based at least in part on the received information, generates a signal to be applied to the one or more antennas 1712. The processing system 1702 includes a processor 1706 coupled to a computer-readable medium/memory 1708. The processor 1706 is responsible for general processing, including the execution of software stored on the computer-readable medium/memory 1708. The software, when executed by the processor 1706, causes the processing system 1702 to perform the various functions described supra for any particular apparatus. The computer-readable medium/memory 1708 may also be used for storing data that is manipulated by the processor 1706 when executing software. The processing system 1702 further includes at least one of the modules 1604, 1606, 1608, and/or 1610 (e.g., which are represented by dotted lines, indicating that the modules may or may not be included in the processing system 1702). The modules may be software modules running in the processor 1706, resident/stored in the computer readable medium/memory 1708, one or more hardware modules coupled to the processor 1706, or some combination thereof. The processing system 1702 may be a component of the UE 615 and may include the memory 682 and/or at least one of the TX MIMO processor 666, the MIMO detector 656, and/or the controller/processor 680.

In some aspects, the apparatus 1602/1602' for wireless communication includes means for determining whether to configure the apparatus 1602/1602' for a first type of resource sharing or a second type of resource sharing between a first RAT and a second RAT, means for reconfiguring one or more resources of the apparatus 1602/1602' for use with the second RAT based at least in part on determining whether to configure the apparatus 1602/1602' for the first type of resource sharing or the second type of resource sharing, means for determining a plurality of performance parameters corresponding to a plurality of combinations of carriers and MIMO layers of the apparatus 1602/1602', and/or the like. The aforementioned means may be one or more of the aforementioned modules of the apparatus 1602 and/or the processing system 1702 of the apparatus 1602' configured to perform the functions recited by the aforementioned means. As described supra, the processing system 1702 may include one or more of the TX MIMO processor 666, the MIMO detector 656, and/or the controller/processor 680. As such, in one configuration, the aforementioned means may be one or more of the TX MIMO processor 666, the MIMO detector 656, and/or the controller/processor 680 configured to perform the functions recited by the aforementioned means.

In some aspects, processor 1706 may include an intelligent hardware device, (e.g., a general-purpose processor, a DSP, a CPU, a microcontroller, an ASIC, an FPGA, a programmable logic device, a discrete gate or transistor logic component, a discrete hardware component, a socket on chip (SOC) processor, or any combination thereof). In some aspects, processor 1706 may be configured to operate a memory array using a memory controller. In other cases, a memory controller may be integrated into processor 1706. Processor 1706 may be configured to execute computer-readable instructions stored in a memory to perform various functions (e.g., functions or tasks supporting signaling methods for frequency offset estimation using reference signals).

FIG. 15 is provided as an example. Other examples are possible and may differ from what was described in connection with FIG. 15.

The foregoing disclosure provides illustration and description, but is not intended to be exhaustive or to limit the aspects to the precise form disclosed. Modifications and variations are possible in light of the above disclosure or may be acquired from practice of the aspects.

As used herein, the term component is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, or the like.

It will be apparent that systems and/or methods, described herein, may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible aspects. In fact, many of these features may be combined in ways not specifically recited in the claims and/or disclosed in the specification. Although each dependent claim listed below may directly depend on only one claim, the disclosure of possible aspects includes each dependent claim in combination with every other claim in the claim set. A phrase referring to "at least one of" a list of items refers to any combination of those items, including single members. As an example, "at least one of: a, b, or c" is intended to cover: a; b; c; a and b; a and c; b and c; and a, b and c.

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method of wireless communication, comprising:
   determining, by a user equipment (UE), whether to configure the UE for a first type of resource sharing or a second type of resource sharing between a first radio access technology (RAT) and a second RAT, wherein one or more UE resources are configured for use with the first RAT; and
   reconfiguring, by the UE, the one or more UE resources for use with the second RAT based at least in part on determining whether to configure the UE for the first type of resource sharing or the second type of resource sharing,
      wherein reconfiguring the one or more UE resources comprises reconfiguring the one or more UE resources based at least in part on a plurality of performance parameters that correspond to a plurality of combinations of carriers and multiple-input multiple-output (MIMO) layers of the UE.

2. The method of claim 1, wherein the first type of resource sharing is a short term resource sharing and the second type of resource sharing is a long term resource sharing.

3. The method of claim 2, wherein the short term resource sharing is triggered by a first application executing on the UE and the long term resource sharing is triggered by a second application executing on the UE.

4. The method of claim 2, wherein reconfiguring the one or more UE resources comprises:
   reporting a measurement parameter that causes at least one UE resource, of the one or more UE resources, to be released from the first RAT when the UE determines that the UE is to be configured for the short term resource sharing.

5. The method of claim 2, wherein reconfiguring the one or more UE resources comprises:
   determining a first resource utilization associated with the first RAT when the UE determines that the UE is to be configured for the short term resource sharing;
   determining a second resource utilization associated with the second RAT when the UE determines that the UE is to be configured for the short term resource sharing; and
   reconfiguring the one or more UE resources based at least in part on the first resource utilization and the second resource utilization.

6. The method of claim 2, wherein reconfiguring the one or more UE resources comprises:
   reporting a change in UE capability associated with the one or more UE resources, wherein the change in UE capability is reported when the UE determines that the UE is to be configured for the long term resource sharing.

7. The method of claim 6, wherein the change in UE capability causes at least one of:
   a release of at least one UE resource, of the one or more UE resources, from the first RAT, or
   an addition of a UE resource for the first RAT.

8. The method of claim 1, further comprising:
   determining the plurality of performance parameters corresponding to the plurality of combinations of carriers and MIMO layers of the UE.

9. The method of claim 1, wherein the plurality of performance parameters include at least one of:
   an estimated downlink throughput parameter,
   an estimated uplink throughput parameter,
   an overall estimated throughput parameter, or
   any combination thereof.

10. The method of claim 1, wherein the first RAT is a wireless wide area network (WWAN) RAT and the second RAT is a wireless local area network (WLAN) RAT.

11. A user equipment (UE) for wireless communication, comprising:
    a memory; and
    one or more processors operatively coupled to the memory, the one or more processors configured to:
       determine whether to configure the UE for a first type of resource sharing or a second type of resource sharing between a first radio access technology (RAT) and a second RAT, wherein one or more UE resources are configured for use with the first RAT; and reconfigure the one or more UE resources for use with the second RAT based at least in part on determining whether to configure the UE for the first type of resource sharing or the second type of resource sharing, wherein the second type of resource sharing is a long term resource sharing, and wherein the one or more processors, when reconfiguring the one or more UE resources, are configured to:

report a change in UE capability associated with the one or more UE resources when the UE determines that the UE is to be configured for the long term resource sharing.

12. The UE of claim 11, wherein the first type of resource sharing is a short term resource sharing.

13. The UE of claim 12, wherein the short term resource sharing is triggered by a first application executing on the UE and the long term resource sharing is triggered by a second application executing on the UE.

14. The UE of claim 12, wherein the one or more processors, when reconfiguring the one or more UE resources, are configured to:

report a measurement parameter that causes at least one UE resource, of the one or more UE resources, to be released from the first RAT when the UE determines that the UE is to be configured for the short term resource sharing.

15. The UE of claim 12, wherein the one or more processors, when reconfiguring the one or more UE resources, are configured to:

determine a first resource utilization associated with the first RAT when the UE determines that the UE is to be configured for the short term resource sharing;

determine a second resource utilization associated with the second RAT when the UE determines that the UE is to be configured for the short term resource sharing; and reconfigure the one or more UE resources based at least in part on the first resource utilization and the second resource utilization.

16. The UE of claim 11, wherein the change in UE capability causes at least one of:

a release of at least one UE resource, of the one or more UE resources, from the first RAT, or an addition of a UE resource for the first RAT.

17. The UE of claim 11, wherein the one or more processors are further configured to:

determine a plurality of performance parameters corresponding to a plurality of combinations of carriers and multiple-input multiple-output (MIMO) layers of the UE; and wherein the one or more processors, when reconfiguring the one or more UE resources, are configured to reconfigure the one or more UE resources based at least in part on the plurality of performance parameters.

18. The UE of claim 17, wherein the plurality of performance parameters include at least one of:

an estimated downlink throughput parameter, an estimated uplink throughput parameter, an overall estimated throughput parameter, or any combination thereof.

19. The UE of claim 11, wherein the UE includes at least one of:

a display, a user interface, or some combination thereof.

20. A non-transitory computer-readable medium storing one or more instructions for wireless communication, the one or more instructions comprising:

one or more instructions that, when executed by one or more processors of a user equipment (UE), cause the one or more processors to:

determine whether to configure the UE for a first type of resource sharing or a second type of resource sharing between a first radio access technology (RAT) and a second RAT, wherein one or more UE resources are configured for use with the first RAT; and reconfigure the one or more UE resources for use with the second RAT based at least in part on determining whether to configure the UE for the first type of resource sharing or the second type of resource sharing, wherein the first type of resource sharing is a short term resource sharing, and wherein the one or more instructions, that cause the one or more processors to reconfigure the one or more UE resources, cause the one or more processors to:

reconfigure, when the UE determines that the UE is to be configured for the short term resource sharing, the one or more UE resources based at least in part on a first resource utilization associated with the first RAT and a second resource utilization associated with the second RAT.

21. The non-transitory computer-readable medium of claim 20, wherein the second type of resource sharing is a long term resource sharing.

22. The non-transitory computer-readable medium of claim 21, wherein the one or more instructions, that cause the one or more processors to reconfigure the one or more UE resources, cause the one or more processors to:

report a change in UE capability associated with the one or more UE resources, wherein the change in UE capability is reported when the UE determines that the UE is to be configured for the long term resource sharing.

23. The non-transitory computer-readable medium of claim 20, wherein the one or more instructions, that cause the one or more processors to reconfigure the one or more UE resources, cause the one or more processors to:

report a measurement parameter that causes at least one UE resource, of the one or more UE resources, to be released from the first RAT when the UE determines that the UE is to be configured for the short term resource sharing.

24. The non-transitory computer-readable medium of claim 20, wherein the one or more instructions, when executed by the one or more processors, cause the one or more processors to:

determine a plurality of performance parameters corresponding to a plurality of combinations of carriers and multiple-input multiple-output (MIMO) layers of the UE; and wherein the one or more instructions, that cause the one or more processors to reconfigure the one or more UE resources, cause the one or more processors to reconfigure the one or more UE resources based at least in part on the plurality of performance parameters.

25. An apparatus for wireless communication, comprising:
   means for determining whether to configure the apparatus for a first type of resource sharing or a second type of resource sharing between a first radio access technology (RAT) and a second RAT, wherein one or more resources of the apparatus are configured for use with the first RAT; and
   means for reconfiguring the one or more resources for use with the second RAT based at least in part on determining whether to configure the apparatus for the first type of resource sharing or the second type of resource sharing,
      wherein the means for reconfiguring the one or more resources comprises means for reconfiguring the one or more resources based at least in part on a plurality of performance parameters that correspond to one or more combinations of carriers and multiple-input multiple-output (MIMO) layers of the apparatus.

26. The apparatus of claim 25, wherein the first type of resource sharing is a short term resource sharing and the second type of resource sharing is a long term resource sharing.

27. The apparatus of claim 26, wherein the means for reconfiguring the one or more resources comprises:
   means for reporting a measurement parameter that causes at least one resource, of the one or more resources, to be released from the first RAT when the apparatus determines that the apparatus is to be configured for the short term resource sharing.

28. The apparatus of claim 26, wherein the means for reconfiguring the one or more resources comprises:
   means for reporting a change in capability associated with the one or more resources, wherein the change in capability is reported when the apparatus determines that the apparatus is to be configured for the long term resource sharing.

29. The apparatus of claim 25, further comprising:
   means for determining the plurality of performance parameters.

30. The apparatus of claim 25, wherein the means for reconfiguring the one or more resources comprises:
   means for reconfiguring, when the UE determines that the UE is to be configured for the first type of resource sharing, the one or more UE resources based at least in part on a first resource utilization associated with the first RAT and a second resource utilization associated with the second RAT.

* * * * *